(12) United States Patent
Maraz et al.

(10) Patent No.: US 10,296,916 B2
(45) Date of Patent: May 21, 2019

(54) SYSTEM AND/OR METHOD FOR HANDLING RECALLED PRODUCT PURCHASES AND/OR RETURN/WARRANTY REQUESTS

(76) Inventors: Maridee Joy Maraz, Sammamish, WA (US); Peter J. Junger, Redmond, WA (US)

( * ) Notice: Subject to any disclaimer, the term of this patent is extended or adjusted under 35 U.S.C. 154(b) by 928 days.

(21) Appl. No.: 12/981,225

(22) Filed: Dec. 29, 2010

(65) Prior Publication Data

US 2011/0119142 A1    May 19, 2011

Related U.S. Application Data

(63) Continuation-in-part of application No. 12/585,310, filed on Sep. 11, 2009, now Pat. No. 8,239,269.

(51) Int. Cl.
*G06Q 20/00* (2012.01)
*G06Q 10/00* (2012.01)
(Continued)

(52) U.S. Cl.
CPC .......... *G06Q 30/014* (2013.01); *G06Q 20/20* (2013.01); *G06Q 20/202* (2013.01);
(Continued)

(58) Field of Classification Search
CPC .................................................. G06Q 20/00
(Continued)

(56) References Cited

U.S. PATENT DOCUMENTS

| 789,106 A | 5/1905 | Seymour |
|---|---|---|
| 1,330,368 A | 2/1920 | Boos |
| 1,393,489 A | 10/1921 | Boos |
| 1,476,819 A | 12/1923 | Hope |
| 4,312,037 A | 1/1982 | Yamakita |
| 4,414,467 A | 11/1983 | Gould et al. |
| 4,458,802 A | 7/1984 | Maciver et al. |
| 4,563,739 A | 1/1986 | Gerpheide et al. |

(Continued)

FOREIGN PATENT DOCUMENTS

| BR | PI 9813567-8 | 10/2000 |
|---|---|---|
| BR | 0101819-1 | 2/2003 |

(Continued)

OTHER PUBLICATIONS

Business Wire, "Multimillion-dollar Health-care Products", Business Wire, Inc., Dec. 15, 1993, 2 pages.

(Continued)

*Primary Examiner* — Ariel J Yu
(74) *Attorney, Agent, or Firm* — Landmark Intellectual Property Law, PLLC

(57) ABSTRACT

Certain exemplary embodiments described herein relate to the field of electronic registration (ER) of purchased products and, more particularly, to improved electronic registration techniques purchase-side and/or return-side handling of recalled items. Certain exemplary embodiments on the purchase-side may help to filter-out products that have recalled been before they are purchased. Certain exemplary embodiments on the return-side may help enable recall return overrides, thus facilitating the acceptance of recalled products even though they might not qualify under an original return/warranty policy. Advantageously, more and more recalled products may be filtered out of circulation through the use of purchase-side and/or return-side recall watch list checking techniques of certain exemplary embodiments. Such purchase-side and/or return-side recall watch list checking may be performed together with or separate from electronic registration techniques in different exemplary embodiments.

23 Claims, 10 Drawing Sheets

(51) Int. Cl.
*G06G 1/14* (2006.01)
*G06Q 30/00* (2012.01)
*G06Q 20/20* (2012.01)
*G06Q 30/06* (2012.01)
*G07F 7/06* (2006.01)
*G07F 11/00* (2006.01)
*G07G 1/00* (2006.01)

(52) U.S. Cl.
CPC ........... *G06Q 30/012* (2013.01); *G06Q 30/06* (2013.01); *G07F 7/06* (2013.01); *G07F 11/002* (2013.01); *G07G 1/0036* (2013.01)

(58) Field of Classification Search
USPC .............................................. 705/17, 20, 22
See application file for complete search history.

(56) References Cited

U.S. PATENT DOCUMENTS

| | | |
|---|---|---|
| 4,598,810 A | 7/1986 | Shore et al. |
| 4,668,150 A | 5/1987 | Blumberg |
| 4,734,005 A | 3/1988 | Blumberg |
| 4,750,119 A | 6/1988 | Cohen et al. |
| 4,789,054 A | 12/1988 | Shore et al. |
| 4,792,018 A | 12/1988 | Humble et al. |
| 4,803,348 A | 2/1989 | Lohrey et al. |
| 4,812,629 A | 3/1989 | O'Neil et al. |
| 4,814,592 A | 3/1989 | Bradt et al. |
| 4,839,505 A | 6/1989 | Bradt et al. |
| 4,858,743 A | 8/1989 | Paraskevakos et al. |
| 4,866,661 A | 9/1989 | De Prins |
| 4,871,054 A | 10/1989 | Murray |
| 4,884,212 A | 11/1989 | Stutsman |
| 4,893,705 A | 1/1990 | Brown |
| 4,896,024 A | 1/1990 | Morello et al. |
| 4,903,815 A | 2/1990 | Hirschfeld et al. |
| 4,967,906 A | 11/1990 | Morello et al. |
| 4,984,155 A | 1/1991 | Geier et al. |
| 4,997,076 A | 3/1991 | Hirschfeld et al. |
| 5,007,518 A | 4/1991 | Crooks et al. |
| 5,020,958 A | 6/1991 | Tuttobene |
| 5,028,766 A | 7/1991 | Shah |
| 5,042,686 A | 8/1991 | Stucki |
| 5,128,520 A | 7/1992 | Rando et al. |
| 5,128,527 A | 7/1992 | Kawai et al. |
| 5,133,441 A | 7/1992 | Brown |
| 5,139,384 A | 8/1992 | Tuttobene |
| 5,143,193 A | 9/1992 | Geraci |
| 5,159,560 A | 10/1992 | Newell et al. |
| 5,216,612 A | 6/1993 | Cornett et al. |
| 5,231,569 A | 7/1993 | Myatt et al. |
| 5,256,863 A | 10/1993 | Ferguson et al. |
| 5,257,741 A | 11/1993 | Rode et al. |
| 5,273,183 A | 12/1993 | Tuttobene |
| 5,311,424 A | 5/1994 | Mukherjee et al. |
| 5,367,148 A | 11/1994 | Storch et al. |
| 5,372,386 A | 12/1994 | Mills |
| 5,375,240 A | 12/1994 | Grundy |
| 5,414,252 A | 5/1995 | Shinoda et al. |
| 5,416,306 A | 5/1995 | Imahata |
| 5,478,990 A | 12/1995 | Montanari et al. |
| 5,520,990 A | 5/1996 | Rotermund |
| 5,521,815 A | 5/1996 | Rose, Jr. |
| 5,537,314 A | 7/1996 | Kanter |
| 5,541,394 A | 7/1996 | Kouchi et al. |
| 5,581,064 A | 12/1996 | Riley et al. |
| 5,602,377 A | 2/1997 | Beller et al. |
| 5,671,279 A | 9/1997 | Elgamal |
| 5,712,989 A | 1/1998 | Johnson et al. |
| 5,721,832 A | 2/1998 | Westrope et al. |
| 5,737,726 A | 4/1998 | Cameron et al. |
| 5,745,036 A | 4/1998 | Clare |
| 5,799,285 A | 8/1998 | Klingman |
| 5,804,803 A | 9/1998 | Cragun et al. |
| 5,857,175 A | 1/1999 | Day et al. |
| 5,889,270 A | 3/1999 | Van Haagen et al. |
| 5,890,138 A | 3/1999 | Goidin |
| 5,895,453 A | 4/1999 | Cook |
| 5,913,210 A | 6/1999 | Call |
| 5,918,213 A | 6/1999 | Bernard et al. |
| 5,918,214 A | 6/1999 | Perkowski |
| 5,949,335 A | 9/1999 | Maynard |
| 5,950,173 A | 9/1999 | Perkowski |
| 5,966,450 A | 10/1999 | Hosford et al. |
| 5,968,110 A | 10/1999 | Westrope et al. |
| 5,978,774 A | 11/1999 | Rogers et al. |
| 5,984,508 A | 11/1999 | Hurley |
| 6,014,635 A | 1/2000 | Harris et al. |
| 6,016,480 A | 1/2000 | Houvener et al. |
| 6,018,719 A | 1/2000 | Rogers et al. |
| 6,025,780 A | 2/2000 | Bowers et al. |
| 6,029,139 A | 2/2000 | Cunningham et al. |
| 6,029,141 A | 2/2000 | Bezos et al. |
| 6,039,244 A | 3/2000 | Finstrewald |
| 6,049,778 A | 4/2000 | Walker et al. |
| 6,055,511 A | 4/2000 | Luebbering et al. |
| 6,064,979 A | 5/2000 | Perkowski |
| 6,085,167 A | 7/2000 | Iguchi |
| 6,085,172 A | 7/2000 | Junger |
| 6,105,001 A | 8/2000 | Masi et al. |
| 6,115,690 A | 9/2000 | Wong |
| 6,119,099 A | 9/2000 | Walker et al. |
| 6,119,164 A | 9/2000 | Basche |
| 6,125,352 A | 9/2000 | Franklin et al. |
| 6,131,088 A | 10/2000 | Hill |
| 6,134,533 A | 10/2000 | Shell |
| 6,148,249 A | 11/2000 | Newman |
| 6,154,738 A | 11/2000 | Call |
| 6,219,652 B1 | 4/2001 | Carter et al. |
| 6,222,914 B1 | 4/2001 | McMullin |
| 6,269,344 B1 | 7/2001 | Junger |
| 6,317,028 B1 | 11/2001 | Valiulis |
| 6,463,421 B2 | 10/2002 | Junger |
| 6,536,659 B1 | 3/2003 | Hauser |
| 6,542,933 B1 | 4/2003 | Durst et al. |
| 6,550,685 B1 | 4/2003 | Kindberg |
| 6,554,187 B2 | 4/2003 | Otto |
| 6,606,608 B1 | 8/2003 | Bezos |
| 6,697,812 B1 | 2/2004 | Martin |
| 6,746,053 B1 | 6/2004 | Afzali-Ardakani et al. |
| 6,757,663 B1 | 6/2004 | Rogers et al. |
| 6,834,268 B2 | 12/2004 | Junger |
| 6,933,848 B1 | 8/2005 | Stewart et al. |
| 6,947,941 B1 | 9/2005 | Koon |
| 6,965,866 B2 | 11/2005 | Klein |
| 7,000,834 B2 | 2/2006 | Hind et al. |
| 7,117,227 B2 | 10/2006 | Call |
| 7,118,478 B2 | 10/2006 | Fayter et al. |
| 7,124,941 B1 * | 10/2006 | O'Connell ................... 235/385 |
| 7,143,055 B1 | 11/2006 | Perkowski |
| 7,162,440 B2 | 1/2007 | Koons |
| 7,343,406 B1 | 3/2008 | Buonanno |
| 7,353,178 B2 * | 4/2008 | Gorski et al. .................. 705/28 |
| 7,376,572 B2 | 5/2008 | Siegel |
| 7,379,899 B1 | 5/2008 | Junger |
| 7,415,617 B2 | 8/2008 | Ginter et al. |
| 7,455,230 B2 | 11/2008 | Junger et al. |
| 7,580,860 B2 | 8/2009 | Junger |
| 7,693,731 B1 | 4/2010 | Weber et al. |
| 7,729,923 B2 | 6/2010 | O'Connor |
| 7,797,164 B2 | 9/2010 | Junger et al. |
| 7,840,439 B2 | 11/2010 | Junger |
| 7,850,081 B2 | 12/2010 | Swan et al. |
| 7,890,373 B2 | 2/2011 | Junger |
| 8,190,449 B2 * | 5/2012 | Grady et al. ...................... 705/2 |
| 8,229,861 B1 * | 7/2012 | Trandal ................ G06Q 30/012 705/26.1 |
| 8,244,644 B2 * | 8/2012 | Knipfer et al. ............... 705/303 |
| 8,321,302 B2 | 11/2012 | Bauer |
| 8,332,323 B2 | 12/2012 | Stals |
| 2002/0010627 A1 | 1/2002 | Lerat |
| 2002/0032612 A1 | 3/2002 | Williams et al. |
| 2002/0116274 A1 | 8/2002 | Hind et al. |

(56) References Cited

U.S. PATENT DOCUMENTS

| | | | |
|---|---|---|---|
| 2002/0133425 A1 | 9/2002 | Pederson et al. | |
| 2002/0143671 A1 | 10/2002 | Afzali-Ardakani et al. | |
| 2003/0041098 A1* | 2/2003 | Lortz | 709/203 |
| 2003/0050891 A1 | 3/2003 | Cohen | |
| 2003/0094494 A1 | 5/2003 | Blanford et al. | |
| 2003/0126034 A1 | 7/2003 | Cheney et al. | |
| 2003/0126079 A1 | 7/2003 | Roberson | |
| 2003/0141358 A1 | 7/2003 | Hudson et al. | |
| 2003/0216969 A1* | 11/2003 | Bauer et al. | 705/22 |
| 2004/0006514 A1 | 1/2004 | Rogers | |
| 2004/0054900 A1 | 3/2004 | He | |
| 2004/0153344 A1 | 8/2004 | Bui et al. | |
| 2004/0172260 A1 | 9/2004 | Junger et al. | |
| 2004/0195341 A1 | 10/2004 | Lapstun et al. | |
| 2004/0224660 A1 | 11/2004 | Anderson | |
| 2005/0097054 A1 | 5/2005 | Dillon | |
| 2005/0100144 A1 | 5/2005 | O'Connor | |
| 2005/0137882 A1 | 6/2005 | Cameron et al. | |
| 2006/0058011 A1 | 3/2006 | Vanska | |
| 2006/0175401 A1 | 8/2006 | Roberts | |
| 2007/0100761 A1 | 5/2007 | Dillon | |
| 2007/0185788 A1 | 8/2007 | Dillon | |
| 2008/0008348 A1 | 1/2008 | Metois | |
| 2008/0052184 A1 | 2/2008 | Junger et al. | |
| 2008/0059226 A1 | 3/2008 | Melker | |
| 2008/0262948 A1 | 10/2008 | Grady et al. | |
| 2009/0150170 A1 | 6/2009 | Junger et al. | |
| 2009/0240516 A1 | 9/2009 | Palestrant | |
| 2009/0281935 A1 | 11/2009 | Junger | |
| 2010/0185533 A1 | 7/2010 | O'Connor | |
| 2010/0235290 A1 | 9/2010 | Junger et al. | |
| 2010/0257486 A1 | 10/2010 | Smith | |
| 2010/0325020 A1 | 12/2010 | Junger et al. | |
| 2011/0016008 A1 | 1/2011 | Maraz et al. | |
| 2011/0029397 A1 | 2/2011 | Junger | |
| 2011/0066514 A1 | 3/2011 | Maraz | |

FOREIGN PATENT DOCUMENTS

| | | |
|---|---|---|
| BR | PI 0503016-1 | 10/2005 |
| BR | PI 0505846-5 | 9/2007 |
| CA | 2374623 | 4/2001 |
| CA | 2404814 | 10/2001 |
| CA | 2408553 | 11/2001 |
| CN | 1177408 | 3/1998 |
| CN | 1289972 | 4/2001 |
| CN | 101068731 | 11/2007 |
| CN | 101089871 | 12/2007 |
| DE | 3 315 724 | 10/1984 |
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| EP | 1028386 | 8/2000 |
| EP | 1841195 | 11/2000 |
| EP | 1 195 704 | 4/2002 |
| EP | 1195704 | 4/2002 |
| EP | 1246109 | 10/2002 |
| EP | 1571541 | 3/2005 |
| EP | 1667018 | 10/2005 |
| EP | 2036015 | 12/2007 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| GT | 200000127 | 10/2000 |
| GT | 200000061 | 11/2000 |
| GT | 200300100 | 3/2006 |
| GT | 200200141 | 7/2007 |
| IN | 1072/CHENP/2003 | 7/2005 |
| IN | 1763/CHENP/2003 | 3/2007 |
| IN | 2137/CHENP/2005 | 7/2007 |
| IN | 538/MUM/2008 | 4/2008 |
| IN | 8258/DELNP/2007 | 4/2008 |
| IN | 8266/DELNP/2007 | 7/2008 |
| IN | 303/KOLNP/2008 | 12/2008 |
| IN | 53/KOL/2008 | 4/2009 |
| IN | 1421/KOLNP/2009 | 6/2009 |
| JP | 02-139698 | 5/1990 |
| JP | 04-347793 | 12/1992 |
| JP | 05-178422 | 7/1993 |
| JP | 05-342482 | 12/1993 |
| JP | 08-124033 | 5/1996 |
| JP | 10-188141 | 7/1998 |
| JP | 10-340301 | 12/1998 |
| JP | 11-066176 | 3/1999 |
| JP | 11-143954 | 5/1999 |
| JP | 2000-123078 | 4/2000 |
| JP | 2002-279090 | 9/2002 |
| JP | 2002-133080 | 10/2002 |
| JP | 2003-316871 | 11/2003 |
| JP | 2005-141374 | 6/2005 |
| JP | 2005-234981 | 9/2005 |
| JP | 2007-226516 | 9/2007 |
| JP | 2007-257561 | 10/2007 |
| JP | 2008-197768 | 8/2008 |
| JP | 2009-032171 | 2/2009 |
| MX | 218248 | 3/1998 |
| MX | PA/a/2000/002497 | 3/1999 |
| MX | 221246 | 7/1999 |
| MX | PA/a/2002/000636 | 11/2001 |
| MX | MX/a/2007/014520 | 11/2006 |
| SV | 1991000023 | 1/1991 |
| SV | 1996000019 | 1/1996 |
| SV | 1998000129 | 1/1998 |
| SV | 2000000045 | 1/2000 |
| SV | 2000000145 | 1/2000 |
| SV | 2003001513 | 1/2003 |
| SV | 2003001514 | 1/2003 |
| WO | 87/00948 | 2/1987 |
| WO | 88/02524 | 4/1988 |
| WO | 88/06771 | 9/1988 |
| WO | 89/09460 | 10/1989 |
| WO | 92/01273 | 1/1992 |
| WO | 99/33016 | 7/1999 |

OTHER PUBLICATIONS

Canadian Search Report for CA Patent Application No. 2,350,551, dated Jan. 21, 2004.

CollegeTermPapers web page printout, "History of Fed Ex", www.collegetermpaper...rmPapers/Aviation/history_of_fed_ex.html (Aug. 24, 2001), 7 pages.

Collins, David Jarrett and Nancy Nasuti Whipple, Using Bar Code: Why It's Taking Over, Second Edition (ON 003696-ON 004031).

Computer Reseller News, "Case Study; Tapping the Channel's 'Best in Class'", CMP Publications, Inc., Jan. 30, 1995, 2 pages.

Consumer Electronics, Warren Publishing, Inc., Consumer Electronics Personals, vol. 35, No. 6, p. 18.

Cooper, Michael D., Design of Library Automation Systems, pp. 83-109 (ON 1859-ON 001873).

Corbin, John, Developing Computer-Based Library Systems, pp. 144-149 (ON 001874-ON 001877).

DataPhase, Inc. Automated Circulation System, 43 pp. (ON 001878-ON 001904).

Deposition of Peter J. Junger, vol. 1 & 2 (Nov. 8-9, 2001) and Exhibits 1-4 & 8-19.

Deposition of Philip M. Rogers (Nov. 7, 2001) and Exhibits 1-19.

Dilger, "The other direction," Manufacturing Systems, v. 15, n. 10, pp. 12-13, Oct. 1997, 2 pages.

Direct Return 2000, Software Overview, http://www.directreturn.com/software_overview.htm, Copyright © 2000 Pharmacy Software Solutions, Inc.

Discount Store News, "New Policy System can Pare Suspect Returns, Cut Losses", Discount Store News, Lebhar-Friedman Inc., Jan. 1, 1996, 2 pages.

Dowlin, Kenneth E., "MAGGIE III: The Prototypical Library System", Library Hi Tech, Issue 16, vol. 4, No. 4, Winter 1986, pp. 7-15 (ON 001960-ON 001970).

(56) References Cited

OTHER PUBLICATIONS

Dranov, Paula, Automated Library Circulation Systems, 1977-78, pp. 24-47 (ON 001905-ON 001929).
Dreamcom web page printout, www.dreamcomdirect.com/RMA.htm (May 25, 1997).
Emigh, Jacqueline, "Item-Level RFID Is Years Away for Retailers", eWeek, Jan. 5, 2005.
Federal Express Information Packet, 56 pages (incl. cover and table of contents).
Fox Appliance Return Parts Policy, Aug. 5, 2003, www.foxmacon.com, online, pp. 1-3.
Georgianis, Maria, "Computer City Moves to Consolidate Returns", Computer Retail Systems, vol. 6, No. 125, Jan. 22, 1998, 2 pages.
Grace, "ABCD Looks to Adopt EDI Transaction Sets", Computer Reseller News, CMP Publications, Inc., Jun. 28, 1993, 2 pages.
Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.
Grosch, Audrey N., Distributed Computing and the Electronic Library: Micros to Superminis, pp. 78-79 (ON 002144-ON 002146).
Grotta, "Return to vendor: the right way to make mail-order returns", PC Sources, Information Access Company, a Thomson Corporation Company, ASAP Coastal Associates Publishing L.P., Feb. 1992, 10 pages.
Heller, "High cost of returns prompts industry cooperation," Discount Store News, Oct. 1998, 3 pages.
Hoadley, Irene Braden and A. Robert Thorson, An Automated On-Line Circulation System: Evaluation, Development, Use, 1973, 19 pp. (ON 001930-On 001948).
Hughes Network Systems, LLC, "HughesNet Terms & Conditions", http://www.nationwidesatellite.com/HughesNet/service/HughesNet_terms.asp, available online Sep. 2, 2008.
IBM Systems Journal, vol. 14, No. 1, 1975, pp. 1-101.
Information Disclosure Statement filed in U.S. Appl. No. 08/725,259 on Oct. 5, 1998.
Information Disclosure Statement filed in U.S. Appl. No. 09/065,552 on Jul. 19, 1999.
Information Disclosure Statement filed in U.S. Appl. No. 09/362,187 on Oct. 26, 2001.
Information Disclosure Statement filed in U.S. Appl. No. 09/494,540 on Jan. 31, 2000.
Information Disclosure Statement filed in U.S. Appl. No. 09/509,021 on Oct. 26, 2001.
Information Disclosure Statement filed in U.S. Appl. No. 09/809,072 on Oct. 26, 2001.
Jiji Press Ticker Service, "JCCI Issues Booklet to Explain Distribution", JiJi Press Ltd., Jul. 20, 1989, 1 page.
Jiji Press Ticker Service, "MITI Working Out Business Practice Guidelines", JiJi Press Ltd., Apr. 20, 1990, 1 page.
Joachim, "FedEx Delivers on CEO's IT Vision", InternetWeek, Oct. 25, 1999, 4 pages.
LaPlante, "Rugby Darby; From proprietary host to a distributed LAN-based architecture in 2 years", InfoWorld, InfoWorld Media Group, Nov. 15, 1993, 4 pages.
Leyden, "Burgled mum finds stolen iPod on eBay," The Register, May 17, 2005, 1 page.
Longwell, "Robec Links Its 18 Sales Facilities Via Newly Adopted NetWare System", Computer Reseller News, Sep. 6, 1993.
Longwell, "Western Digital Wins—Price/performance gives driver maker victory margin", Computer Reseller News, CMP Publications, Inc., Jun. 28, 1993, 3 pages.
Margulis, "Reclaim: an efficient way to handle damaged products", U.S. Distribution Journal, BMT Publications Inc., Mar. 15, 1992, 7 pages.
Matthews, Joseph R., "Graphical User Interfaces GUI in Library Products", Library Technology Reports, vol. 32, No. 1, Jan. 1996, p. 53 (ON 001972-ON 001976).
Meyer, James, "NOTIS: The System and Its Features", Library Hi Tech, Issue 10, vol. 3, No. 2, 1985, pp. 81-89 (ON 001949-ON 001959).
Narda News, "Retailing in Cyberspace", Apr. 1995, pp. 21-22.
Nintendo GAMEBOY Point of Purchase Mail-In Card.
PR Newswire, "CompuServe Introduces Electronic Product Registration Software", PR Newswire Association, Inc., Mar. 10, 1994, 2 pages.
PR Newswire, "Escada Offers a Garden Variety for Spring", PR Newswire Association, Inc., Mar. 10, 1994, 2 pages.
Quinn, "Why Wang took the third-party route", Information Access Company, a Thomson Corporation Company, ASAP Reed Publishing USA, vol. 30, No. 2, p. 30, Feb. 1991.
Reynolds, Dennis, Library Automation: Issues and Applications, pp. 42-49 and pp. 146-149 (ON 002147-ON 002153).
Rigney, "User Migrates to Windows NT", InternetWeek, CMP Publications, Inc., Jan. 10, 1994, 2 pages.
Rogers et al., "Going Backwards: Reverse Logistics Trends and Practices", Reverse Logistics Executive Council, 1998 (entire book).
Rosenbloom, "Midnight Express", Inc., Jul. 2001, 4 pages.
Saffady, William, "Integrated Library Systems for Microcomputers and Mainframes: A Vendor Study", Library Technology Reports, vol. 30, No. 1, Jan. 1994, p. 5 (ON 001977-ON 002087).
Saffady, William, "Vendors of Integrated Library Systems for Microcomputers and Mainframes: An Industry Report, part 1", Library Techology Reports, vol. 33, No. 3, May 1997, p. 277 (ON 002088-ON 002096).
Saffady, William, "Vendors of Integrated Library Systems for Microcomputers and Mainframes: An Industry Report, part 2", Library Techology Reports, vol. 33, No. 3, May 1997, p. 277 (ON 002097-ON 002138).
Salmon, Stephen R., Library Automation Systems, p. 239 (ON 002154-ON 002155).
Salton, Gerard, Dynamic Information and Library Processing, pp. 62-69 (ON 002139-ON 002143).
Scala, Betsy Video Business, "Distributors seek 30-day returns" , v 13 , n 3 , p. I + Jan. 22, 1993.
Scala, Betsy Video Business, "Distributors seek 30-day returns" , v 15 , n 39 , p. I + Oct. 6, 1995.
Schuman, Evan,"Bar-Code Scam at Wal-Mart: A Matter of Priorities", eWeek, Jan. 5, 2005.
Schuman, Evan,"Wal-Mart Stung in $1.5 Million Bar-Code Scam", eWeek, Jan. 5, 2005.
Sigafoos et al., "Absolutely Positively Overnight!: The Unofficial Corporate History of Federal Express", St. Luke Press, 1988, pp. 1-22.
Sleeper, "FedEx Pushes The Right Buttons to Remain No. 1 In Fast Shipping", Investor's Business Daily, May 25, 2001, 2 pages.
Synchronics Software Product Information guide, 95 pages.
Synchronics® User Manual: Inventory Plus, Version 6.5, Apr. 1993 (ON 004464-ON 005116).
Synchronics® User Manual: Point of Sale, Version 6.5, Apr. 1993 (ON 005117-ON 005892).
White, Howard S., Library Technology Reports, Mar.-Apr. 1982, vol. 18,No. 2, pp. 178-184 (ON 001851-ON 001858).
Witt, "How to Master the Art of Returns: Automation Is the Key", Material Handling Engineering, Jun. 1994, pp. 58-60.
Witt et al., "Distribution: a differentiator in 2000", Material Handling Engineering, Penton Publishing Inc., Oct. 1995, 15 pages.
Office Action issued on Jan. 8, 2013 in corresponding Canadian Application No. 2,759,637.
"Man accused in Lego selling scam", http://www.kptv.com/Global/story.asp?S=4137050&nav=muni156_2, Nov. 18, 2005, 1 page.
"No more scamming Super Mario," Automatic I.D. News, vol. 12, p. 15, Sep. 1996, 3 pages.
"Software Maker Promises Many Happy Returns", Drug Topics, vol. 140, No. 5, pp. 124-128 (Mar. 4, 1996).
Jan. 6, 2005 Blog (Message 4 of 17) about Schuman article"Bar-Code Scam at Wal-Mart: A Matter of Priorities".
Jan. 13, 2005 Blog (Message 14 of 17) about Schuman article"Bar-Code Scam at Wal-Mart: A Matter of Priorities".
1992 Nintendo Product Returns Policy.
1994 Nintendo Product Returns Policies and Procedures.

(56) References Cited

OTHER PUBLICATIONS

1995 Nintendo Product Returns Policies and Procedures.
1996 Nintendo Product Returns Policies and Procedures, 4 pages.
Amazon.com Returns Policy, Our Return Policy is Simple, Jun. 20, 2000, Amazon.com, www.amazon.com/exec/obidos/subst/help/returns-policy.html, pp. 1-2.
Automotive News, "Reynolds, ADP differ on superhighway progress", Crain Communications, Inc., Apr. 11, 1994, 3 pages.
Birnbaum, Henry, General Information Manual: IBM Circulation Control at Brooklyn College Library, 29pp. (ON 001822-ON 001850.
Brewin et al., "Follow That Package!", Computer World, vol. 35, No. 12, Mar. 19, 2001, 4 pages.
Business Wire, "Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.
Business Wire, "DataTrend receives award from AT&T Global Information Solutions", Business Wire, Inc., Nov. 7, 1995, 2 pages.

\* cited by examiner

SYSTEM AND/OR METHOD FOR HANDLING RECALLED PRODUCT PURCHASES AND/OR RETURN/WARRANTY REQUESTS

CROSS-REFERENCE TO RELATED APPLICATION

This application is a continuation-in-part (CIP) of U.S. application Ser. No. 12/585,310, the entire contents of which are hereby incorporated herein by reference.

TECHNICAL FIELD

Certain exemplary embodiments described herein relate to the field of electronic registration (ER) of purchased products and, more particularly, to an improved electronic registration system and/or method that enable(s) purchase-side and/or return-side handling of recalled items. Certain exemplary embodiments on the purchase-side may help to filter-out products that have recalled been before they are purchased. Certain exemplary embodiments on the return-side may help enable recall return overrides, thus facilitating the acceptance of recalled products even though they might not qualify under an original return/warranty policy.

BACKGROUND AND SUMMARY

Electronic registration (ER) of product transactions has become available for the purpose of reducing unauthorized returns of purchased products and/or unauthorized warranty repair on purchased products. Electronic product registrations systems provided for this purpose are disclosed in, for example, U.S. Pat. Nos. 5,978,774; 6,018,719; and 6,085,172, the disclosures of which are all incorporated by reference herein in their entirety. The electronic registration system relies on the use of a unique identifier, such as a serial number linked to a UPC (and/or RFID) or its equivalent, for each product that is purchased. The serial number is obtained at the point of sale for inclusion in a registration database, together with other information, such as a date of transaction. This database can then be accessed in connection with an attempted product return/warranty transaction for the purpose of determining if the product qualifies for return/warranty under applicable return/warranty criteria under which the product was originally sold. Such electronic systems may also be used in connection with repair and/or exchange transactions, in addition to returns, by enabling an accurate determination as to whether the product qualifies for any of these actions under the appropriate policies and criteria under which the product was originally sold.

The ER system uses pre-established return/repair policies and procedures that are programmed into the ER system so that the system can perform a check when a product is presented for return to determine if the product qualifies for return, replacement and/or warranty repair based on sales transaction information available in the ER system for the particular product at issue. Thus, known ER systems include a database of return qualification information (or warranty/replacement criteria) for various manufacturers and/or retailers which enables the system to make an accurate determination with respect to whether or not a product actually qualifies for return (or warranty/replacement) based on the appropriate criteria and at the time the product is actually presented for return. Such ER systems have greatly reduced improper and fraudulent returns and warranty claims.

While such ER systems have proven to be very useful in their current forms, additional improvements in the system are still desired to make such ER systems more flexible in operation in order to benefit customers, retailers, and manufacturers. For example, problems may arise in situations where retailers expect to receive commissions from service provides for the sale of hardware devices that accompany subscription/post-paid service agreements. Currently, retailers deeply discount their wireless hardware devices, for instance, for promotions designed to entice consumers to sign up for subscription/post-paid service agreements. Wireless service providers then pay commissions to retailers, after a predetermined period of time with the service, for each new customer acquired. This commission is intended to make up for the loss on (or reduced margin for) the hardware cost at the point-of-sale (POS). For example, a retailer may sell a "voice plan" for a mobile phone on behalf of a service provider (e.g., AT&T, Verizon, etc.) to a consumer and offer a mobile phone to the consumer at a reduced or zero cost. After a predetermined amount of time (such as, for example, 30 days), the service provider may provide a commission to the retailer, thus offsetting some or all of the loss incurred by the retailer.

A challenge facing the industry involves customers cancelling their services directly with the wireless service providers during a time window before which the retailer is eligible for the activation commission. Upon cancellation, the consumer typically is advised to return the hardware. Unfortunately, such returns are not consistently completed or tracked at the unique item level, e.g., to complete the transaction cycle. A retailer thus may lose both a commission and the device. Because the customer typically signs a contract or agreement with the service provider as opposed to the retailer, the retailer is left with little recourse when attempting to reclaim the product and/or avoid having to forego the commission.

Consumer fraud is another challenge facing the industry. In an unfortunately not-uncommon scheme, devices are purchased from retail locations for free or reduced prices and the corresponding contracts are cancelled. Rather than returning the devices, however, they are shipped overseas, sold on Internet auction sites, pawned, etc. Any residual value thus benefits the scammer, while the retailer is left with the loss on the hardware cost.

These problems are related, in part, to the fact that retailers and wireless service providers do not have a linked/synchronized tracking system supporting the return of wireless devices.

Thus, it will be appreciated that there is a need in the art for improved ER techniques that close the gap between retailers and service providers, e.g., in connection with subscriptions/post-paid service agreements and related hardware and/or other devices or products.

One aspect of certain exemplary embodiments of this invention relates to closing the gap between retailers and service providers, e.g., in connection with subscriptions/post-paid service agreements and related hardware and/or other devices or products.

Another aspect of certain exemplary embodiments relates to providing unique item-level tracking from the POS transaction through to any cancellations in service and returns to the store or service provider.

Another aspect of certain exemplary embodiments relates to the ability to provide an override a return decline, on a serial number level (e.g., via the ER system and its associated return validation program), to authorize returns outside of the retailer return policy, when such returns are "expected" via a cancellation update registration from a wireless service provider.

Still another aspect of certain exemplary embodiments relates to the ability to the ability to provide targeted recall notifications. For instance, because some recalls affect only a portion of a product (e.g., a model/year, batch, or the like), certain example embodiments may provide the retailer with transaction information related to purchases of recalled items so that it may, in turn, contact its consumers in a targeted manner and/or post notices in only stores where appropriate (e.g., where the products were or are being sold). Furthermore, for club retailers, items purchased from a gift registry, or other situations where contact information is potentially known, the retailer may have or be provided with the consumer's contact information and therefore may make targeted recall notifications.

According to certain exemplary embodiments, a method of facilitating return of products sold in connection with services at point-of-sale (POS) locations is provided. A sale of a service and a product associated with the service to a customer are registered with an electronic registration (ER) system, with the registering including storing an original sale date and an identifier associated with the product in an ER database of the ER system. When the service is cancelled by the customer at the POS location: a return transaction is processed in accordance with a return policy of the POS location and/or the service provider, and the ER database is updated to reflect the return of the product and the cancellation of the service. When the service is cancelled by the customer through the service provider: (1) a monetary interest is taken from the user in the event that the customer does not subsequently return the product to the POS location, and (2) the ER database is updated to reflect the cancellation of the service and the taking of the interest.

According to certain exemplary embodiments, an electronic registration (ER) system is provided. An ER database is configured to store information pertaining to sales of services and products associated with the services, with the information including original sale dates and identifiers associated with the products, and with the sales having taken place at point-of-sale (POS) locations. A computer is configured to execute instructions tangibly stored on a computer-readable storage medium, with the instructions causing the computer to perform a method comprising: processing a return transaction in accordance with a return policy of the POS location and/or the service provider and updating the ER database to reflect the return of the product and the cancellation of the service when a service is cancelled by a customer at a POS location; and taking a monetary interest from the user in the event that the customer does not subsequently return the product to the POS location and updating the ER database to reflect the cancellation of the service and the taking of the interest when the service is cancelled by the customer through the service provider.

In place of, or in addition to the above, it is noted that consumer products sometimes are purchased and subsequently recalled. When a previously purchased consumer product is recalled, it oftentimes is well-past the retailer return policy. Customers sometimes have the option to work directly with the product manufacturer for resolution. However, the inventors of the instant application have observed that customers often would like to deal directly with the party (e.g., retailer) from which the product was originally purchased. In addition to the above, recalled products often are filtered through the supply chain and may exist in transit, on shelves, etc. It would be desirable to remove these products from the supply chain, e.g., prior to purchase by a consumer, but this oftentimes is difficult.

Thus, it will be appreciated that it would be advantageous to provide improved techniques for processing recalled items. Certain exemplary embodiments described herein provide improved techniques for processing recalled items, on the purchase side and/or at the return side.

In certain exemplary embodiments, a method of processing an item return or warranty request at a point-of-sale (POS) location is provided. At least first identifying information for the item is received from the point-of-sale location. Using at least one processor of an electronic registration (ER) system, it is determined whether the item qualifies for the return or warranty request based on data stored in an ER database. When it is determined that the item does not qualify for the return or warranty request based on data stored in an ER database: (a) it is determined, using at least one processor, whether the item is likely subject to a recall, and (b) when it is determined that the item is subject to the recall, an override instruction is sent to the POS location.

In certain exemplary embodiments, a method of processing an item presented for purchase at a point-of-sale (POS) location. At least first identifying information for the item is received from the point-of-sale location. A recall watch system including a recall watch database storing information regarding a plurality of items subject to recall is provided. It is determined, using at least one processor of the recall watch system, whether the item is likely subject to a recall. When it is determined that the item is subject to recall, an instruction is sent to the POS location. When it is determined that the item is not subject to recall, the purchase is allowed.

In certain exemplary embodiments, an electronic registration (ER) system for processing an item return or warranty request made at a point-of-sale (POS) location is provided. An interface is configured to receive at least first identifying information for the item from the point-of-sale location. An ER database stores information concerning return and/or warranty information for a plurality of products. At least one processor is configured to: determine whether the item presented in connection with the return or warranty request qualifies for the return or warranty request based on data stored in the ER database; and when it is determined that the item does not qualify for the return or warranty request based on data stored in an ER database (a) determine whether the item is likely subject to a recall after consulting a recall watch database storing information identifying products subject to recall, and (b) cause an override instruction to be sent to the POS location when it is determined that the item is subject to the recall. It will be appreciated that the override instruction may in certain instances be transparent to or hidden from a store clerk and/or customer, whereas the override instruction may be made known in other examples.

In certain exemplary embodiments, a recall watch system for processing an item presented for purchase at a point-of-sale (POS) location is provided. An interface is configured to receive at least first identifying information for the item from the point-of-sale location. A recall watch database stores information regarding a plurality of items subject to recall. At least one processor is configured to: determine whether the item is likely subject to a recall based on the information stored in the recall watch database, cause an instruction to be sent to the POS location when it is determined that the item is subject to recall, and allow the purchase when it is determined that the item is not subject to recall.

It will be appreciated that these aspects and embodiments may be combined in various combinations and sub-combinations to achieve yet further exemplary embodiments. Also, it will be appreciated that the exemplary embodiments herein may be implemented as any suitable combination of programmed logic circuitry including, for example, hardware, software, firmware, etc.

BRIEF DESCRIPTION OF THE DRAWINGS

These and other features and advantages will be better and more completely understood by referring to the following detailed of exemplary illustrative non-limiting implementations in conjunction with the drawings, of which.

DETAILED DESCRIPTION

Figure 1:
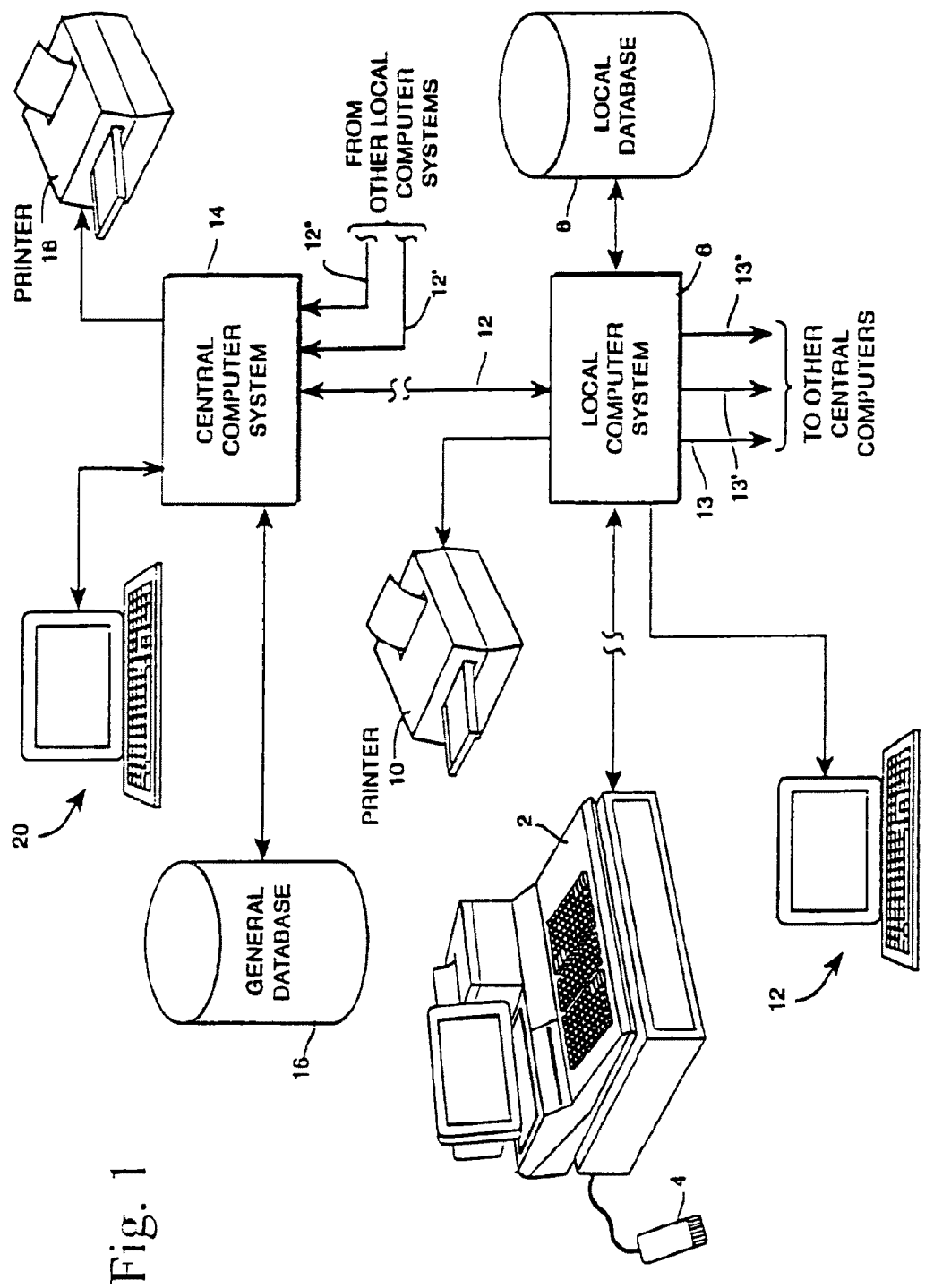
FIG. 1 is a schematic block diagram illustrating an example of an overall electronic product registration (ER) system that may be used in accordance with an exemplary embodiment.

An example of one type of electronic product registration (ER) system that is preferably used in connection with the instant invention is illustrated in FIG. 1. Briefly, this example system includes a point of sale register 2 and an associated bar code scanner 4. The register 2 is preferably connected with a local computer system 6 in any suitable manner. In certain situations (e.g., single store retailers), it may be advantageous to have the local computer system 6 located in proximity to the register 2. For large chain stores, however, it may be advantageous to situate the local retailer computer 6 at a central location with links to the registers 2 at individual stores. The particular arrangement will depend on the preferences and circumstances of the specific retailer and may vary in accordance therewith.

The local retailer computer system includes an associated local database 8 for storing registration information. Additionally, a local printer 10 and an operator terminal 11 may be provided. The operator terminal may be used, for example, by a store clerk upon return of merchandise to locate pertinent sales information in the local database 8. The printer 10 may be used to produce hard copies of, for example, end-of-day sales reports and/or the like.

In the exemplary embodiment, a communication channel 12 is provided between the retailer computer system 6 and a central computer system 14. The central registration computer system may, for example, be an independent registration center computer system which electronically registers product transactions for a number of different retailers. In other words, the central computer system may be operated by a third-party service provider.

A general registration database 16 is associated with the central registration computer system 14 for storing transaction information from a plurality of retailer computer systems 6. Additionally, a printer 18 and an operator terminal 20 may be included with the central registration computer system 14. As discussed below in greater detail, the central registration computer system may maintain a number of data files pertaining to individual retailers, manufactures and the like. These data files include information applicable to the particular individual retailer, distributor, manufacturer or the like and are preferably maintained by that particular individual or entity. For example, a data file may contain specific return/warranty policy information applicable to that particular individual or entity.

It should be appreciated that the central computer system 14 is preferably intended to handle product registrations for a number of different manufacturers and/or other vendors. Accordingly, the general registration database may employ a structure wherein the product registrations for each participating vendor are maintained in separate areas. Alternatively, separate databases may be employed for each participating vendor. Of course, other data structures may be employed so long as the registration center is able to properly keep track of the product transaction information and particular return and/or warranty policies associated with each transaction.

As illustrated in FIG. 1, the central registration computer system 14 may have a number of additional communications links 12', 12", etc. for receiving information from other local computer systems. Thus, for example, a registration center may receive information from a number of different retailers. Additionally, the local computer system 6 may include a number of additional communication channels 13, 13', 13", etc. for connecting with other central computer systems. Accordingly, an individual retailer can electronically register products with a number of different registration databases, if desired. Furthermore, a number of communication channels 15, 15', 15", etc. can be provided for communications between the central registration computer system 14 and individual manufacturer computer systems and computer systems of third party service providers, law enforcement agencies and/or the like. Of course, a general access channel such as an Internet connection may also be made available for authorized access to the central computer system 14.

The electronic registration process begins when a customer brings merchandise to the register 2 for check-out. The sales clerk enters the SKU number which identifies the type of product involved in the transaction (e.g., Super Nintendo Entertainment System, Nintendo Game Boy, Nintendo N64, etc.) by, for example, scanning a UPC product code included on the product packaging. Of course, key entry or another technique for entering the SKU number may be used. Electronic registration might not be necessary for a substantial number of small commodity products (e.g., batteries, candy, diapers, etc.) that are commonly sold by retailers. Accordingly, a check may be made, based on the type of product as identified by the UPC code, to determine whether this is a product for which electronic registration is desired. If so, the store associate is prompted to enter the serial number (or other unique identifier such as an RFID, or an equivalent to a unique identifier) of the individual item.

The serial number may be entered, for example, by scanning a serial number printed on the packaging. Alternatively, the serial number as it appears on the product may be scanned through a window in the packaging. This alternative ensures that the individual product is identified even if it is mispackaged. Also, repackaging of returned merchandise would be simplified. Other techniques, such as key entry, may also be used. Because the serial number is unique to each individual product, it acts as individual production identification information.

Once the serial number is entered, a check may be made to ensure that the serial number is valid. If not, the store associate is again prompted to enter the serial number. This is repeated until a valid serial number is obtained. Once the serial number is verified, a local database may be updated with the serial number information and any other necessary or desired information. At minimum, however, the local database should include an indication of the date on which the transaction took place. Other information might include the price paid, the store associate responsible for the sale, and the like.

The serial number of the individual product is preferable printed as part of a written customer transaction receipt. The serial number may be printed adjacent the description and SKU number of the registered product. Thus, it will be a simple matter to correlate serial numbers with associated products, particularly when several registered products appear on a single customer sales receipt. Of course, additional information may be printed as well.

The date of the transaction will typically be printed at either the beginning or the end of the sales receipt, but may appear anywhere on the receipt. After the serial number is printed, a check is made to determine whether sales are complete. Ordinarily, this will be based on the store associate hitting a TOTAL button on the cash register. Thereafter, the central registration computer system 14 is contacted and the general registration database 16 is updated with the transaction information.

Inasmuch as ER systems are known, further specific details regarding ER systems themselves will not be provided herein except as needed for a complete understanding of the invention. As seen from the above description of an ER system, original policies are defined for products when they are first sent to the retailer by the vendor. The ER system preferably includes the policies of both the vendor and the retailer and enables the policies of both parties to be easily and conveniently enforced.

Figure 2:
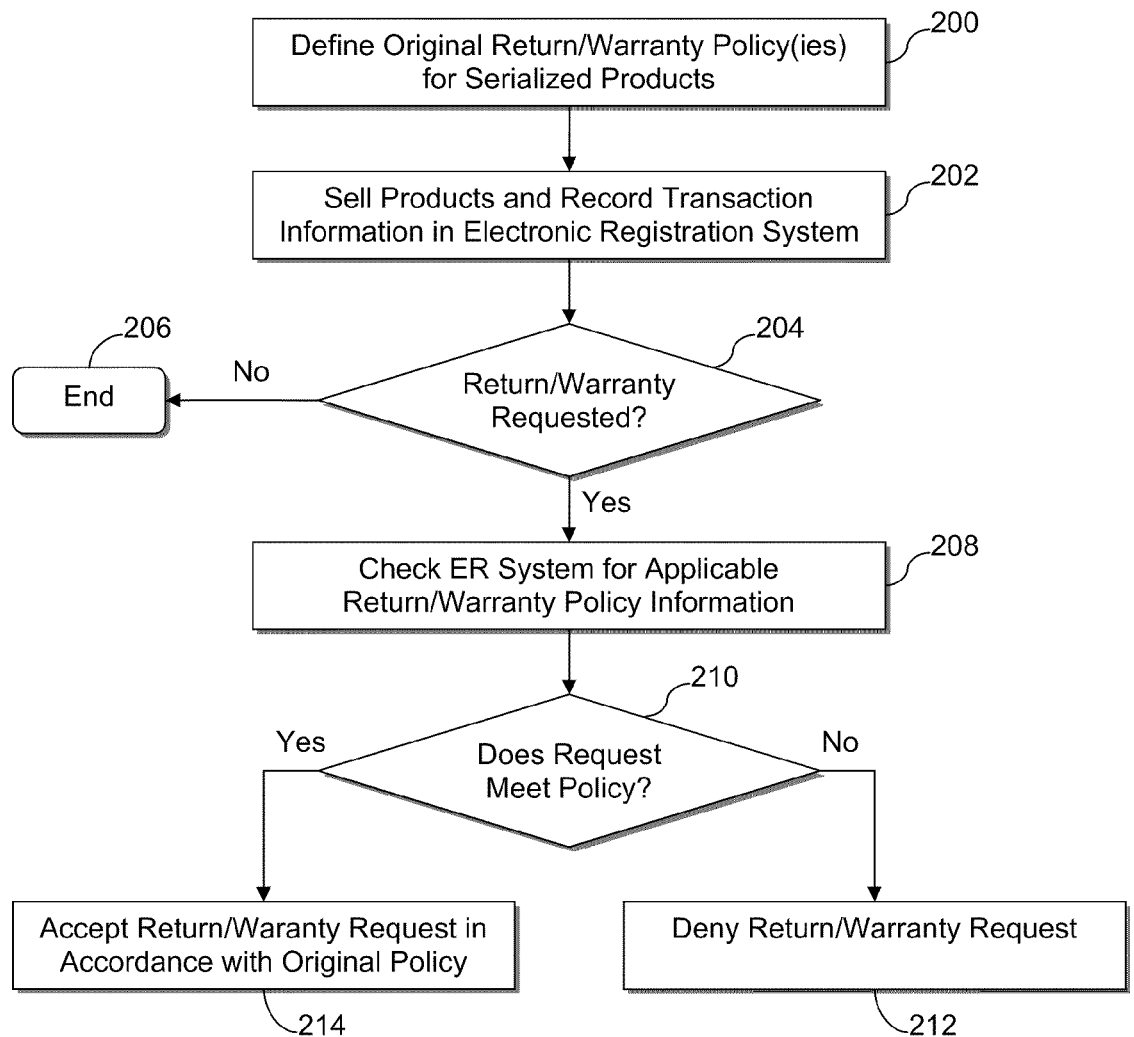
FIG. 2 is a high level flow chart of some of the main steps performed in accordance with prior electronic product registration (ER) systems.

FIG. 2 shows the main steps performed in connection with conventional ER systems. As shown in FIG. 2, the return/warranty policy(ies) are defined for serialized products and entered into the ER system (step 200). The ER system uses the policies and the sales transaction information, as well as the date on which a return is requested, to determine if the product qualifies for return when presented for return. Thus, when the products are sold, the sales transaction is recorded in the ER database (step 202). If the consumer is satisfied with the product, then the process ends (step 206). On the other hand, if a return is requested (step 204), the ER system is accessed to obtain the return qualification information for the specific product being presented for return (step 208). In accordance with conventional ER systems, the return request is handled based on the return qualification information provided by the ER system based on the original policies under which the product was originally sold. Thus, based on the return qualification information provided by the ER system, a determination is made as to whether or not the product qualifies for return/warranty repair or the like (step 210). If the product does qualify for the action requested, the request can be honored by the retailer and the transaction can be completed (step 214). On the other hand, if the ER system indicates that the product does not qualify for the requested action, the customer is typically denied the return or warranty repair (step 212). Of course, the store employee could decide, for some reason, to ignore the ER information and accept the product anyway.

A two-part policy generally is used with respect to transactions involving post-paid services/subscriptions and related products. The first part of a typical policy applies to activities that take place within a predefined time period (e.g., 30 days, 90 days, etc.). As one example, within 30 days, a customer may return a phone and cancel a corresponding wireless service at the retailer POS location. In this regard, the customer presents the phone for return at retailer's return counter. The customer sometimes may be redirected to a different location (e.g., a wireless electronics desk) for return service, depending on the specific retailer's capabilities and arrangements. Using the POS location's system, authorized personnel (e.g., a wireless store associate) accesses the original purchase record to determine whether the attempted return is within 30 days of the original purchase. If so, the customer is allowed to return the device, and the service is cancelled (e.g., by the wireless store associated on behalf, and with the permission, of the customer).

The second part of the typical policy applies to activities that take place outside of the predefined time period (e.g., beyond the 30-day, 90-day, or other time window). As one example, outside of 30 days and/or at any time under the services agreement between the consumer and the service provider, the customer may contact the service provider directly and cancel the service (e.g., by contacting the service provider over the phone, using a website, etc.). In such circumstances, the retailer often does not receive back the device hardware. These problems are further exacerbated when the retailer cannot collect the activation commission from the service provider. This represents a losing proposition for the retailer, regardless of whether it is caused by innocent error or with the intent to defraud the retailer and/or the service provider.

Thus, it will be appreciated that, as indicated above, current ER techniques could be improved by better "closing the gap" between (1) retailers that sell post-paid services/subscriptions on behalf of service providers, along with goods associated with such post-paid services/subscriptions, (2) and the service providers themselves. The current lack of communication between retailers and service providers potentially hurts retailers when consumers, intentionally or unintentionally, fail to return the previously obtained products during the time period in which the retailer is not entitled to a commission. Accordingly, certain exemplary embodiments relate to ER techniques that address one or more of these and/or other problems by providing, for example, unique item-level tracking from the POS transaction through to any cancellations in service and returns to the store or service provider.

Certain exemplary embodiments may involve an optional pre-registration process. The pre-registration process may involve shipping products to destinations and recording associated serial numbers (SNs) in an ER database of the ER system. In certain exemplary implementations, the service provider (e.g., the wireless service provider) is responsible for transmitting the device serial numbers to the ER system when the products are being shipped to retailer POS locations (e.g., from the wireless service provider directly, from the manufacturer of the devices, etc.). The ER system may receive information including serial numbers and/or other product identifiers such as, for example, UPC, IMEI (International Mobile Equipment Identity) number, along with other related information including, for example, shipping dates, target locations, etc. The ER system may record all of this information in a centrally accessible national ER database. It will be appreciated that, as described above, this information may be useful for inventory tracking purposes. It also will be appreciated that such information may be used to the transfer ownership to the retailer in the event of theft, thereby making it easier for the retailer to seek legal recourse against a thief and recovery of their property.

Following this or any other appropriate (though optional) pre-registration process, the wireless device, together with a post-paid service/subscription, may be sold at the retailer through the POS system. This sale may then trigger a POS electronic registration process. In brief, the retailer may capture and transmit (e.g., via scanning) the device serial number to the ER system when the product is sold to a consumer. The ER system will then receive this information and record it in the ER database. In this regard, the UPC and/or IMEI and serial number, or any other appropriate identifiers, may be recorded in the ER database, along with transaction information such as, for example, original sale date, POS location, sales person, POS service/subscription terms, etc. The ER system also may append the promotional hardware price to the transaction. See, for example, U.S. Pat. Nos. 5,978,774; 6,018,719; and 6,085,172, each of which is hereby incorporated herein by reference in its entirety. Once the sale is complete, the product may be activated, e.g., by communicating the UPC, IMEI, serial number, and/or other identifier(s) to the service provider from either or both of the POS location and the ER system. The service provider ideally will pay a commission to the retailer after a contracted duration of time elapses under the service contract. This commission may help to offset any or all of a discount offered to the customer by the retailer in connection with the product tied to the post-paid service/subscription.

Certain exemplary embodiments address four possible service cancellation scenarios. Each of these cancellation scenarios, and illustrative ways in which they are handled, are described in greater detail below and with reference to FIGS. 3-6.

EXAMPLE SCENARIO 1

Simple Return to Retailer

Figure 3:
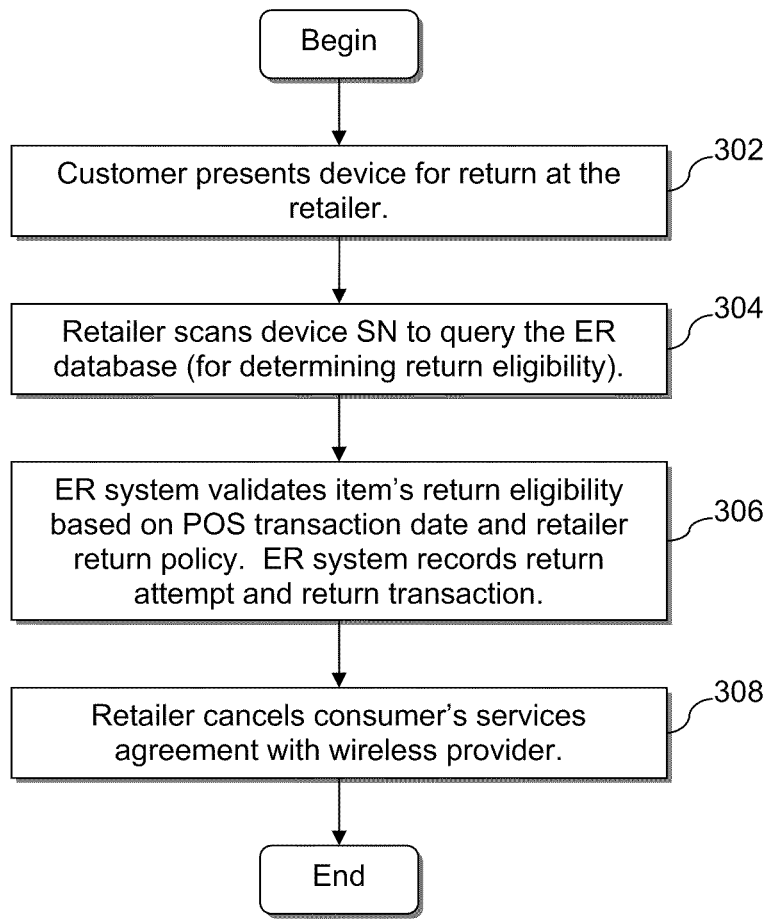
FIG. 3 is a flowchart illustrating a process for a simple return to the retailer within a predefined time period from the original sale date, in accordance with certain exemplary embodiments.
Figure 4:
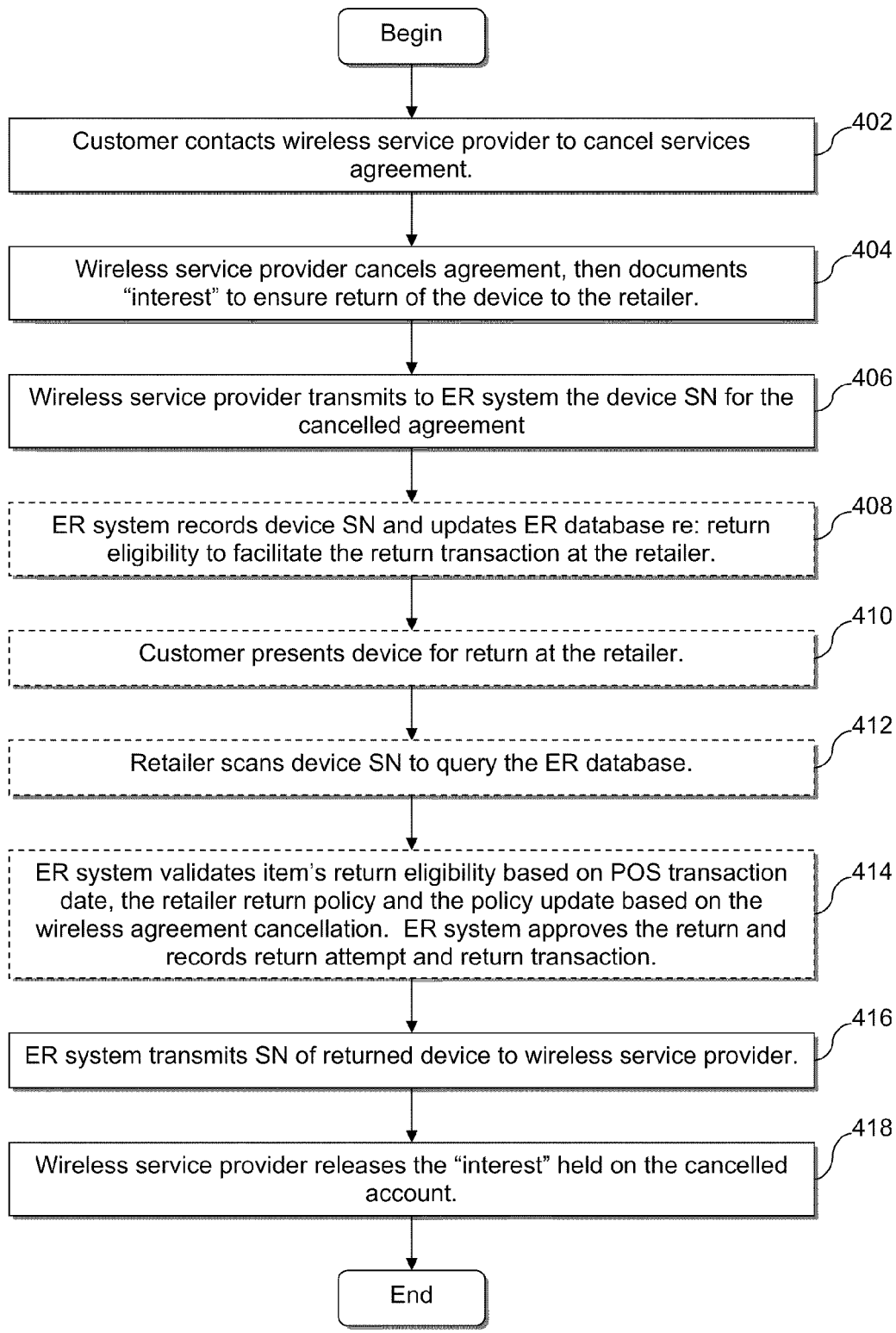
FIG. 4 is a flowchart illustrating a process when a customer cancels a service directly with the service provider and later returns an associated device to a retailer, in accordance with certain exemplary embodiments.

The first example scenario involves a simple return to the retailer within a predefined time period (e.g., 30 days) from the original sale date. Within the predefined time period, the customer may return the device to the retailer and cancel the service agreement. In this regard, FIG. 3 is a flowchart illustrating a process for a simple return to the retailer within a predefined time period from the original sale date, in accordance with certain exemplary embodiments.

In step 302, the customer presents the device for return at the retailer. The retailer then scans the device serial number to query the ER database (e.g., for later determining return eligibility) in step 304. In step 306, substantially real-time validation is performed against the national ER database, e.g., to determine return eligibility based on the item's original purchase record. From the customer's perspective, the return transaction is completed. In step 308, which is optional in certain exemplary embodiments, the retailer may cancel the consumer's services agreement with the service provider. This may be accomplished by transmitting the returned serial number (or IMEI or other unique identifier) to the service provider to "close the loop." Because the device is returned within the predefined time period (e.g., 30 days) from the original sale date, the retailer does not receive the commission, but the retailer does recover their hardware device. Of course, it will be appreciated that the decision as to whether to provide or deny the commission may be transparent to the customer.

EXAMPLE SCENARIO 2

Cancellation with Service Provider and Device Return

Figure 5:
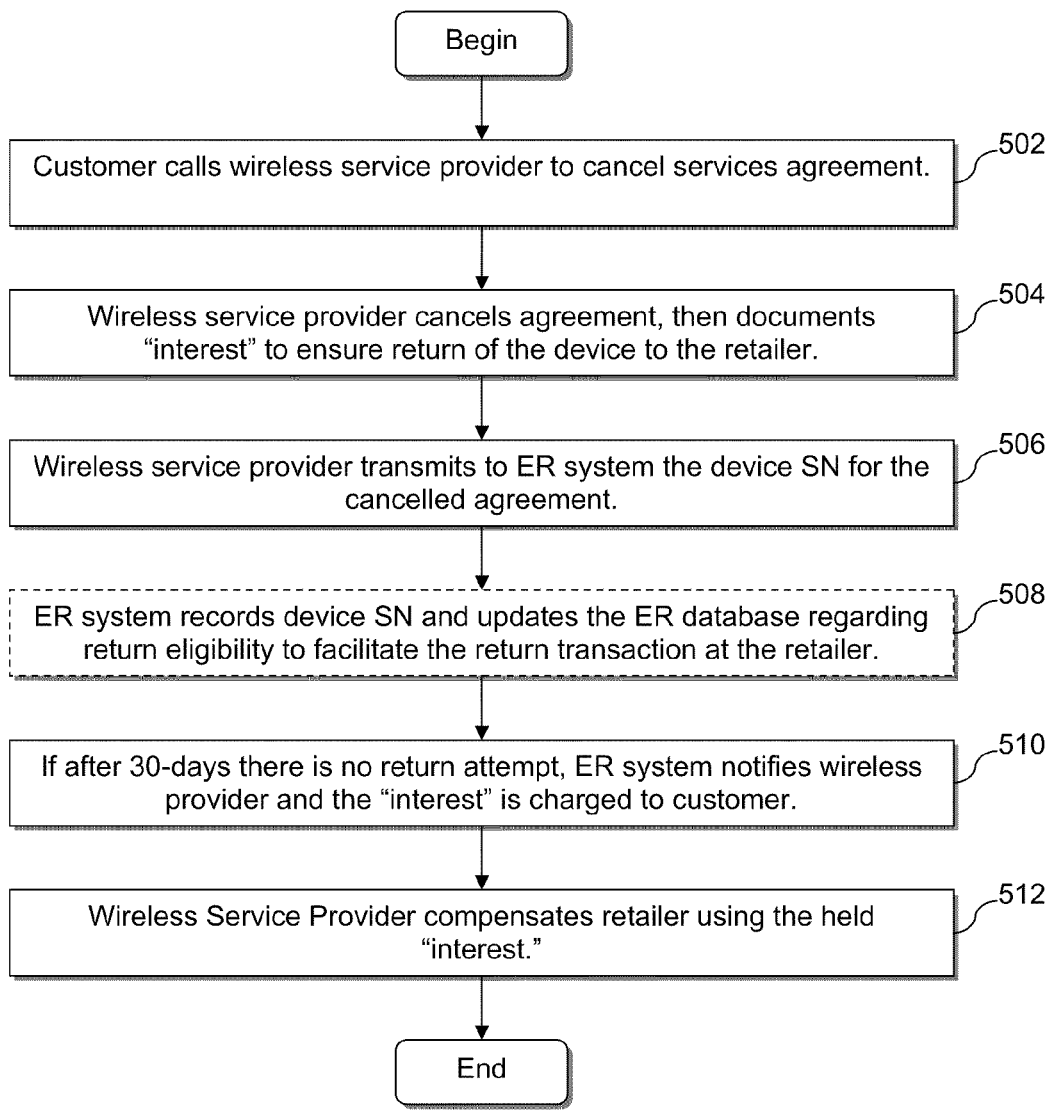
FIG. 5 is a flowchart illustrating a process when a customer cancels a service directly with the service provider and does not return an associated device to a retailer, in accordance with an exemplary embodiment.

At any time, the customer may choose to cancel the service agreement with the service provider, intentionally or unintentionally bypassing the retailer. In this regard, the second example scenario involves a cancellation directly with the service provider and a device return before the retailer is entitled to a commission from the service provider. FIG. 5 is a flowchart illustrating a process indicating what may happen in this scenario, in accordance with certain exemplary embodiments.

In step 402, a customer contacts the wireless service provider to cancel the services agreement with the service provider, absent direct involvement from the retailer. This sort of contact may be made by, for example, telephoning the service provider, accessing a website of the service provider, going to service provider's own POS location, etc. In step 404, the wireless service provider cancels the service agreement, and documents an "interest" to ensure return of the device to the retailer, and the service provider transmits to the ER system the device serial number for the product associated with the cancelled agreement in step 406. One or both of these steps may involve obtaining and transmitting the product's serial number (or IMEI or other identifying code), e.g., by scanning, reading an RFID tag, manual entering (e.g., on the part of wireless service personnel and/or the customer, etc.), and/or the like.

The "interest" may correspond to some or all of the retailer's normal commission and/or the price of the product. For example, in certain exemplary embodiments, the service provider may at least temporarily collect credit card information, or some other appropriate form of compensation, from the consumer. If the retailer's commission would have been $100, then this amount may be at least temporarily charged to the customer's credit card. In certain exemplary embodiments, a checking account may be debited, or scheduled for automatic debit (e.g., for processing in batch, for processing individually at a later time in the event that the product is not returned within a predetermined time interval, etc.). This amount may be fully or partially refunded to the customer, provided that the customer returns the product. A full refund may be available if the product is returned in normal working order, whereas only a partial or no refund may be available if the product is damaged or destroyed, etc. Alternatively, the amount may only be charged or debited in the event that the product is not returned to the retailer within a predetermined amount of time (e.g., a one-week, two-week, 30-day, or other window). It will be appreciated that the possible initial charging/debiting at the time of the cancellation, the possible later refunding, the possible later charging/debiting upon the lack of a satisfactory return, etc., may be facilitated at least in part by the ER system, which may track and/or schedule such events, and/or the service provider's systems. It is expected that so doing will incentivize the customer to return the product to the retailer while also protecting the retailer's interest in the deactivated and/or no longer necessary product.

Steps 408 to 412 are optional addition and/or alternate steps that may be help facilitate the return of recalled items. Some current ER techniques allow validation only upon returns or product recalls, as opposed to service/subscription cancellation. Thus, although certain exemplary embodiments may modify existing ER systems to accommodate returns for corresponding service/subscription cancellation, certain exemplary embodiments may alternatively or in addition treat a service/subscription cancellation like a recall so that a default return policy override may enable the return of the hardware when the corresponding service/subscription cancellation is logged in the ER database. The manufacturer may transmit a list of recall serial number or other unique or non-unique identifiers to the ER system. The ER system may update the ER database extending and/or overriding each item's return eligibility, allowing returns of these items past the standard retailer return policy dates. The ER system may report the recall serial number returns to the retailer and manufacturer, in accordance with the accounting and other agreements that are relevant and in place as between the retailer, manufacturer, and/or service provider.

In particular, in step 408, the ER system records the device serial number and updates the ER database regarding return eligibility, to facilitate the return transaction at the retailer. In step 410, the customer presents the device for return at the retailer. In step 412, the retailer obtains (e.g., scans, reads an RFID tag, etc.) the device's serial number to query the ER database. The ER system then validates the item's return eligibility based on, for example, the POS transaction date, the retailer return policy and the policy update based on the wireless agreement cancellation. The ER system may approve the return when appropriate, and record the return attempt and return transaction, in step 414.

Regardless of whether the optional steps 408 to 414 are implemented, the ER system transmits the serial number of returned device to wireless service provider in step 416 and, in step 418, the wireless service provider releases the "interest" held on the cancelled account in the event that the product is returned within the allotted time period. It will be appreciated that "penalties" may be applied if the product is not returned at all or within the allotted time period. Such penalties may be monetary in nature, and may increase over time, e.g., until the full value of the product or the retailer's commission is met.

EXAMPLE SCENARIO 3

Cancellation with Service Provider and No Device Return

As indicated above, the customer at any time may choose to cancel the service agreement with the service provider, intentionally or unintentionally bypassing the retailer. In this regard, the third example scenario involves a customer cancelling directly with the service provider before the retailer earns a commission, and in which the customer does not return the associated product within a predefined time period following the cancellation, and FIG. 5 is a flowchart illustrating a process indicating what may happen in this scenario, in accordance with certain exemplary embodiments.

As shown in FIG. 5, a customer contacts the service provider to cancel the services agreement in step 502. It will be appreciated that the customer may contact the service provider in the above-described and/or any other appropriate way. In step 504, the service provider cancels the agreement, and documents the "interest" to help ensure return of the device to the retailer. The service provider transmits to the ER system the device serial number for the cancelled agreement in step 506.

In an optional step 508, which may be enabled for product recalls, for instance, the ER system records the device serial number and updates the ER database regarding return eligibility to facilitate the return transaction at the retailer. In any event, in step 510, if after a predetermined amount of time (e.g., one week, two weeks, 30-days, etc.) there is no return attempt, the ER system may notify the wireless provider, and the "interest" may be charged to customer. In step 512, the service provider compensates the retailer using the held "interest."

As noted above, the "interest" may be charged immediately or only after the predetermined amount of time has passed. Even after that time, the user may be entitled to a partial or complete refund of the "interest" depending, for example, on the state of the returned device. In such example instances, the refund may be made from the retailer as opposed to the service provider.

In certain exemplary embodiments, the "interest" or information about the interest may be taken by the service provider, with the service provider then holding this interest and the ER system directing its possible release, transfer, etc. However, in certain exemplary embodiments, the ER system itself may hold some or all of the collected money in escrow and later disburse it to the retailer, service provider, and/or customer, as appropriate. This latter arrangement may be advantageous, for example, in that it may allow for the direct transfer of funds without relying on intervening instructions and/or approvals from the service provider, retailer, customer, etc. It will be appreciated that this escrow-like function may be used in this or any other scenario involving the taking of an interest. Likewise, it will be appreciated that the taking of the interest and the charging of the interest may be accomplished at the same time (e.g., at the time of the service cancellation) or at different times (e.g., "taking" at the time of the service cancellation and "charging" beyond a predetermined amount of time), in different exemplary embodiments and in this or any other scenario.

EXAMPLE SCENARIO 4

Cancellation with Device Return

Figure 6:
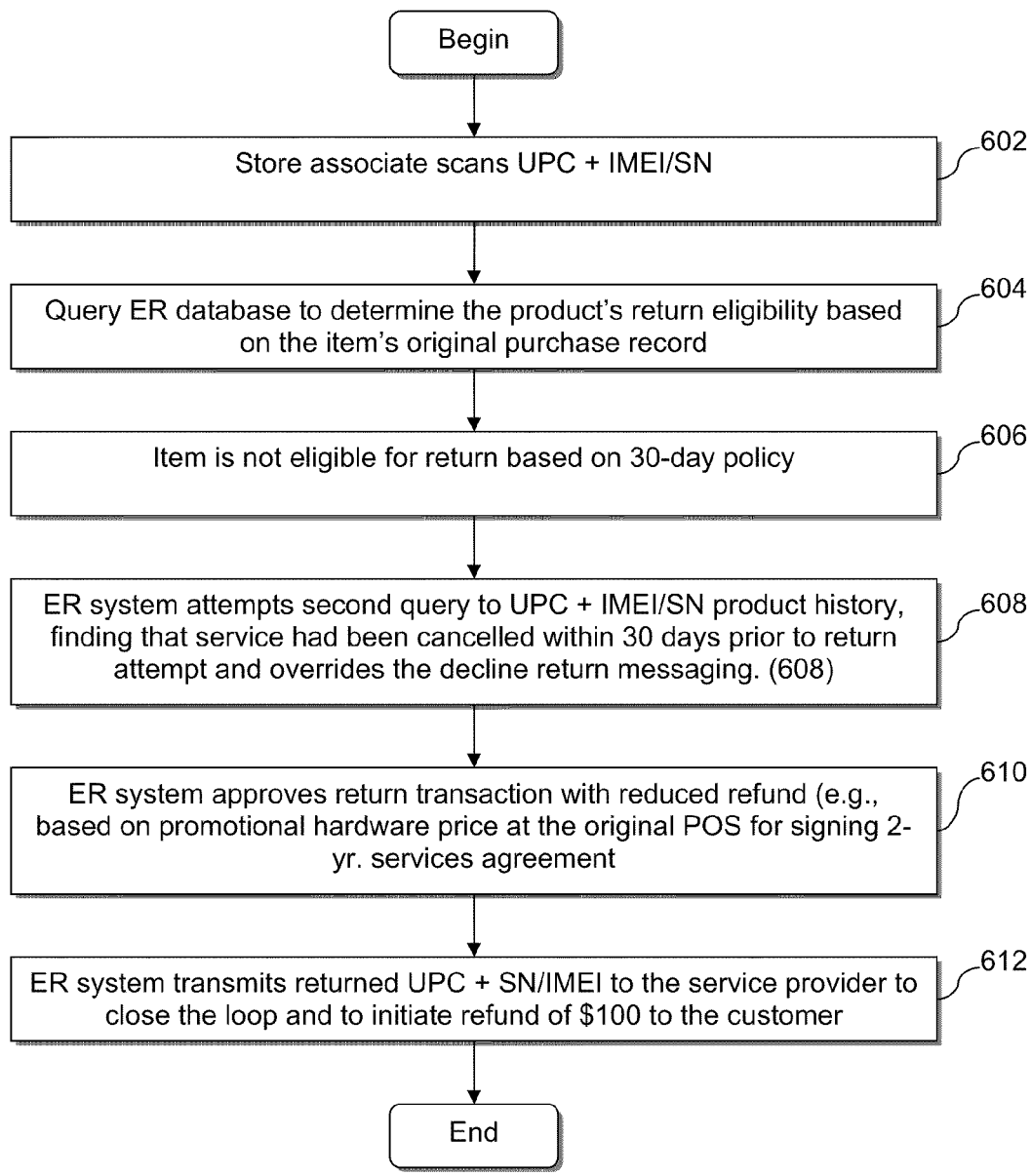
FIG. 6 is a flowchart illustrating a process for a return to the retailer beyond a predefined time period from the original sale date, in accordance with certain exemplary embodiments.

The fourth example scenario involves a return to the retailer outside of a predefined time period (e.g., 30 days) from the original sale date. The default action would be to deny the return because it is outside of the predefined time period. However, because the product is tied to the service/subscription agreement, the default action may be overridden based on the retailer's policy (e.g., accepting returns when the service/subscription is cancelled). The override of the return denial may be treated like a product recall (see above), e.g., so that the retailer can process the return in accordance with the applicable policy for products tied to post-paid services/subscriptions. In this regard, FIG. 6 is a flowchart illustrating a process for a return to the retailer beyond a predefined time period from the original sale date, in accordance with certain exemplary embodiments.

In step 602, the store associate identifies the product, e.g., by scanning the UPC, serial number, and/or IMEI number. In step 604, substantially real-time validation is performed against the ER database to determine the product's return eligibility based on the item's original purchase record. It is determined in step 606 that the item is not eligible for return based because the predefined time period (e.g., 30-day) beyond the original purchase date has passed. However, in step 608, the ER system attempts a second query against the product history (e.g., with reference to the unique identifier) and finds that the service had been cancelled within a second predefined amount of time (e.g., 30 days) prior to the present return attempt and, accordingly, overrides the decline return messaging in accordance with the applicable return policy.

Given this second query, in step 610, the ER system approves the return transaction with a reduced refund (e.g., $100 or any other appropriate amount based on, for instance, the promotional hardware price at the original POS for signing services agreement. The ER system transmits the returned SN/IMEI to the service provider to close the loop and to initiate refund of $100 to the customer in step 612.

Although several example scenarios have been provided above, it will be appreciated that they are not exhaustive. Other return/cancellation scenarios also are possible and may be handled in accordance with the example techniques described herein. For example, in certain exemplary embodiments, the $100 need not be collected/refunded if the product is in proper working order at the time of the cancellation.

It will be appreciated that the exemplary techniques described herein may lead to a number of advantages. For example, the exemplary embodiments described herein may lead to cost savings for retailers, e.g., as they may at least partially make up for lost commissions by either receiving a returned product from a cancelling customer or receiving monetary compensation from that cancelling customer. Similarly, it will be appreciated that certain exemplary embodiments advantageously may result in improved relationships between retailers and wireless service providers, e.g., in that retailers will not feel "cheated" out of commissions or unduly burdened with the costs of intentionally or unintentionally non-returned products. Further, certain exemplary embodiments advantageously may reduce the likelihood of consumer fraud related to devices sold along with post-paid and/or subscription services.

The ER database of certain exemplary embodiments may store only product-related information. That is, in certain exemplary embodiments, the ER database may not store information related to individuals purchasing, returning, exchanging, or otherwise dealing with products. For example, individual names, addresses, credit card information, etc., need not be maintained by the ER database itself in certain exemplary embodiments. Rather, this information may instead be maintained by the POS location's systems and/or other third-party systems. Having the ER database track products rather than people may be advantageous in certain instances, as consumer anonymity may be maintained.

Although certain exemplary embodiments have been described in relation to wireless devices and services sold at retail locations, it will be appreciated that the exemplary techniques described herein may be applied to other kinds of products, or even goods and services. In general, the exemplary techniques described herein may be applied to any goods that are coupled to services that are sold at non-service provider locations. For example, the techniques of certain exemplary embodiments may be applied to cable boxes and cable services, satellite dishes and satellite services, satellite radios and satellite radio services, etc. Furthermore, the service/subscription need not be "post-paid" in certain exemplary embodiments.

As alluded to above, it would be desirable to provide improved techniques for processing returns of previously purchased recalled items and/or for facilitating the removal of not-yet-purchased recalled products from the supply chain. Thus, as explained above, one aspect of certain exemplary embodiments relate to improved electronic registration techniques that enable purchase-side and/or return-side handling of recalled items, and another aspect of certain exemplary embodiments on the purchase-side may help to filter-out products that have recalled been before they are purchased.

Figure 7:
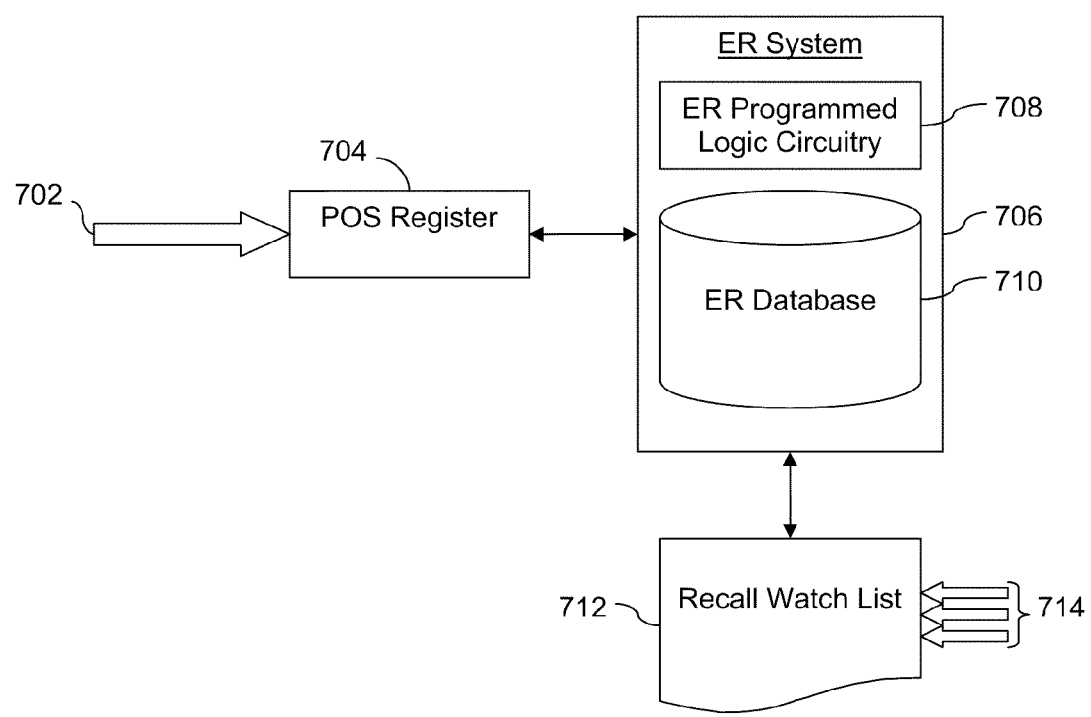
FIG. 7 is a schematic view of an improved system for handling recalled items on the purchase and/or return side in accordance with certain exemplary embodiments.

FIG. 7 is a schematic view of an improved system for handling recalled items on the purchase and/or return side in accordance with certain exemplary embodiments. An item 702 is presented to a POS register 704. The item 702 may, for example, be presented for return or warranty service, or for original purchase in different exemplary instances. Consider first an original purchase example scenario. In an original purchase example scenario, the POS register 704 may interact with the ER system 706, e.g., for electronic registration with the ER database 710 in concert with the ER programmed logic circuitry. The POS register 704 may also interact with a recall watch list 712 directly or indirectly, e.g., via the ER system 706. The recall watch list 712 may include information regarding recalled products. For example, the recall watch list 712 may include unique identifiers (UPC +serial number, EPC, etc.) for recalled products or individual items. The recall watch list 712 may be populated by receiving inputs 714 from one or more authorized sources. Such authorized sources may include, for example, manufacturers, private and/or non-profit consumer product watch groups, public and/or governmental groups such as the Consumer Product Safety Commission (CPSC) in the United States, retailers, etc. Such groups in certain exemplary instances may flag recalled products, e.g., by inputting through a suitable interface unique item identifiers, broader product identifiers, subsets of products (e.g., certain lot numbers, dates manufacturers, places manufactured), etc. Such groups in certain exemplary instances also may input suggested or required actions (e.g., return product to manufacturer, destroy product, allow sale with different terms/conditions, etc.).

If an item or product is flagged in the recall watch list, a suitable message may be sent to the POS register 704. The message may be, for example, an instruction to stop the sale, alter the terms and conditions of the sale (e.g., the product is to be sold "as is," with no or a reduced warranty/return policy, etc.), adjust the price, get a new or replacement unit from the shelves, etc. Such instructions may be coded and/or stored in the recall watch list, e.g., by the authorized party flagging the product in certain exemplary instances. Alternatively, or in addition, the threat level of the recalled item or product may be coded and/or stored in the recall watch list 712, e.g., so that the POS location can define its own policy for whether and how the sale should be completed. Such a threat level may be classified on a numeric scale, on a high/medium/low scale, etc.

Additional feedback prompts may be generated at or for the POS location in certain exemplary embodiments. Such feedback prompts may include, for example, instructions to return the item to the manufacturer, destroy it, hold it for pickup, etc. In other words, instructions for the transaction and/or for actions to be taken following the transaction may be stored in or accessible via the recall watch list 712.

To increase the speed of a search through the recall watch list 712, a non-unique but still somewhat narrowing identification mark may be processed, e.g., as an initial step in a multi-step process. For example, a master serial number or serial number mask may be checked. As another example, a UPC may be checked. Lot numbers and/or lot production codes may be checked, optionally with a date range, in certain exemplary instances. Of course, other information may be checked in place of, or in addition, these example marks. In certain exemplary embodiments, if an initial check results in a match or suspected recall, further information may be checked, e.g., to confirm whether the item is a recalled item. For instance, if a UPC check suggests a possible or likely recall, the serial number can be checked in a verification step. Two, three, four, or more levels of checking/verifying may be provided in different exemplary embodiments. Given that a wide variety of potential identifying information may be consulted, it will be appreciated that the techniques described herein may be used in connection with non-serialized products, as well.

These and/or similar example purchase-side techniques may complement or supplement current recall techniques, which typically involve merely posting notices on bulletin boards in retail locations to comply with government regulations. As will be appreciated, such notices are not always detected by a would-be purchaser and/or store personnel before a sale is completed. Inadvertent mistakes also may be made, e.g., in terms of accidentally allowing a sale that should be denied, misreading a number and permitting a sale, etc., which could sometimes result in misses, mistakes, and/or the like.

The exemplary techniques herein also are advantageous in terms of filtering out products that might otherwise not be removed from a store's shelves, e.g., by accidental oversight, mistake, because the products are in the supply chain pipeline (e.g., in transit, being unloaded from pallets, etc.) when a sweep for recalled products is made (e.g., at a POS location), etc. Thus, it will be appreciated that, over time, the techniques described herein may in certain exemplary instances be used to remove a large percentage (e.g., all or substantially all) of the flagged recalled products from circulation. Of course, in certain exemplary embodiments, the recall watch list may be provided as a temporary service offered in place of or in addition to a full ER system.

Return-side product recall techniques may be provided in certain exemplary embodiments. For instance, referring once again to FIG. 7, when a product 702 is presented for return or warranty service to a POS register 704, the ER system 706 may be consulted. In addition, or in the alternative, the recall watch list 712 may be consulted. If the product is past its return/warranty period but nonetheless has been flagged as recalled, an override message to accept the return or warranty request may be sent to the POS register 704. In certain exemplary embodiments, when a customer attempts to return a recalled product present in the recall watch list 712, the initial return validation scan may determine the purchase record and the retailer return policy in the ER system 706. Rather than simply denying the return as ineligible, certain exemplary embodiments may secondarily check if the product is on the recall serial number list and override the return decline messaging to allow the return. Thus, certain exemplary embodiments allow the ER database to facilitate this consumer return to a retail store for items where a party (e.g., the manufacturer) has issued a recall past the retailer return/warranty policy. However, as alluded to above, the check(s) of the ER system 706 and the recall watch list 712 may be performed separately and independently of one another in certain exemplary instances.

Even if a product is within a return/warranty policy, the recall watch list 712 may still be consulted and messaging therefrom may still be possible. For example, even though a product qualifies for return/warranty, a message may indicate that the product should nonetheless be returned to the manufacturer, that it should be destroyed, that different or additional changes should be made, etc. Such messaging may be provided even though the consumer at least initially presented the item for a different purpose (e.g., for repair, replacement, etc.). In cases where a retailer takes a recalled product back from the customer, instructions may be give as to how the retailer is to send it to the manufacturer (e.g., for a refund, etc.). Such messaging may be coded and/or stored in the recall watch list 712. Thus, it will be appreciated that certain exemplary embodiments may involve messaging among and/or between the POS location (in some cases the retailer), the manufacturer, etc., to provide notifications about the recall, what steps should be taken, etc.

Given the example scenarios described above, it will be appreciated that certain exemplary embodiments may involve real-time or substantially real-time validation and/or notification, e.g., for recall product purchases and/or recall product return/warranty requests. Such messaging may be "two-way" messaging, e.g., between the POS location and the recall watch list 712, and may include, for example, information regarding how the sale or return is to proceed, what is to happen after the sale or return, etc.

Although the recall watch list 712 is shown as being separate from the ER system 706 in FIG. 7, certain exemplary embodiments may provide the recall watch list 712 as a component of the ER system 706 and/or as integral with or an optional extension of the ER database 710. In certain exemplary embodiments, the ER system 706 and the recall watch list 712 may be consulted and/or implemented together or independently of one another (e.g., as providing "stand-alone" structures and functionalities). In exemplary embodiments where the ER system 706 and the recall watch list 712 are implemented separately, the recall watch list 712 may collect and/or have access to personal information about the person to whom the item is being sold/from whom the item is being presented for return/warranty service. Such information may be used in connection with more conventional "robo-calling," mailing, and/or other techniques of disseminating information about a broad or general product recall. In exemplary embodiments where the ER system 706 and the recall watch list 712 are in communication with one another, it may be possible to more directly target potential owners of recalled products. For instance, the ER system 706 may have general information about the geographic areas where recalled products were sold (individually or in large quantities), and more pointed notifications can be made in these areas (e.g., notices in local newspapers, on local television channels, etc.).

Although not shown in FIG. 7, the recall watch list 712 may include other components and/or may be part of a larger system. For example, one or more databases, table structures, files, etc., may be provided in certain exemplary embodiments. An exemplary system may include a secured input interface (e.g., via the Internet or other computer network) allowing for authorized inputs thereto, an interface with one or more POS registers, an interface with an ER system, etc. Recall watch list programmed logic circuitry may help coordinate these and/or other actions (e.g., searching, updating, responding to queries, etc.).

In certain exemplary embodiments, other parties may be able to consult the recall watch list 712. For example, logistics personnel may be able to check the recall watch list 712, e.g., when accepting a shipment, when passing on a shipment, etc. The use of barcodes, e.g., at the pallet or other group level may help facilitate the checks to the recall watch list 712. Secondary (and optional tertiary, etc.) checks may be performed if an initial broad-based check suggests that one or more products possibly or likely are subject to recall.

Figure 8:
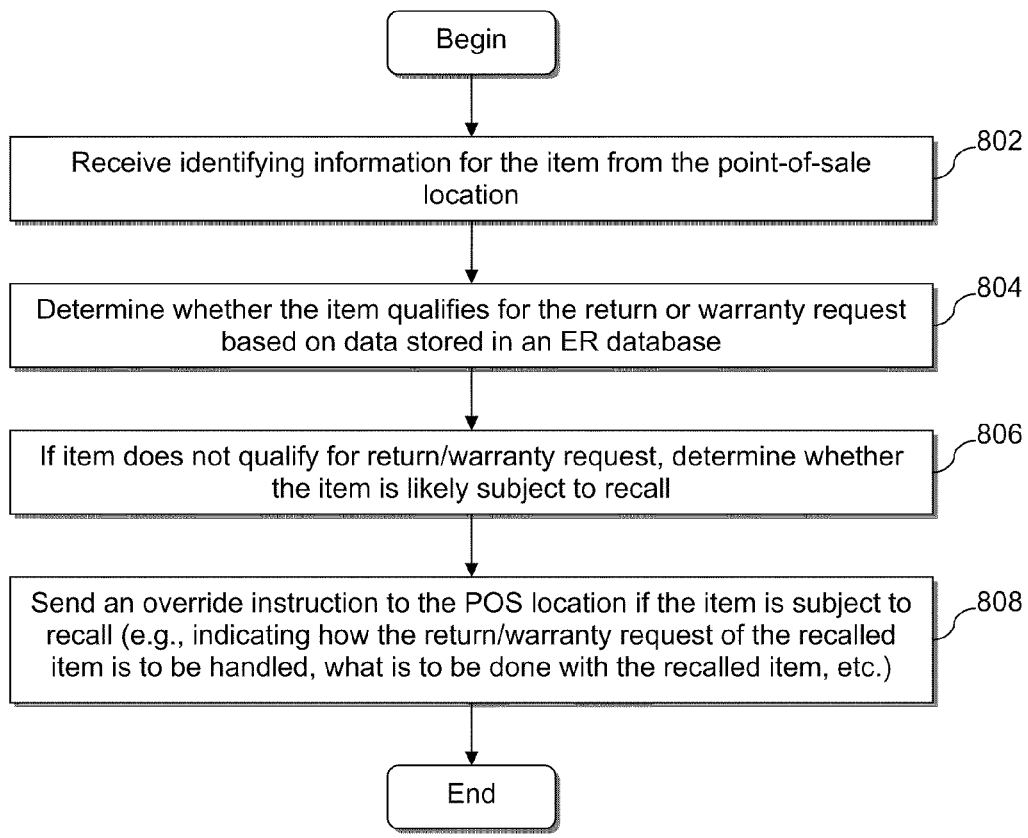
FIG. 8 is a flowchart illustrating a process for handling recalled items presented for return or warranty service in accordance with an exemplary embodiment.

FIG. 8 is a flowchart illustrating a process for handling recalled items presented for return or warranty service in accordance with an exemplary embodiment. In step S802, identifying information for the item is received from the point-of-sale (POS) location. Such information may include a unique identifier of the product in certain exemplary embodiments. However, as indicated above, in certain exemplary embodiments, the information may non-uniquely identify an item or product, the information may be for a non-serialized product, etc. In step S804, it is determined whether the item qualifies for the return or warranty request based on data stored in an ER database, e.g., using the identifying information. It will be appreciated that this step may be optional in certain exemplary embodiments, e.g., that include a recall watch list but omit an ER database; where a recall watch list is checked prior to the ER database and, for example, the recall watch list indicates that the item is subject to recall and should be handled accordingly, thereby obviating the need for a check of the ER database; etc.

If the item does not qualify for return/warranty request, in step S806, it is determined whether the item is likely subject to recall. This may involve one or more checks based on one or more levels of detail regarding the identifiers received from the POS location and sent to the recall watch list, etc., in different embodiments. An override instruction may be sent to the to the POS location if the item is subject to recall (e.g., indicating how the return/warranty request of the recalled item is to be handled, what is to be done with the recalled item, etc.). Of course, the recall watch list may be checked even if the item does qualify for the return/warranty request in certain exemplary embodiments.

Figure 9:
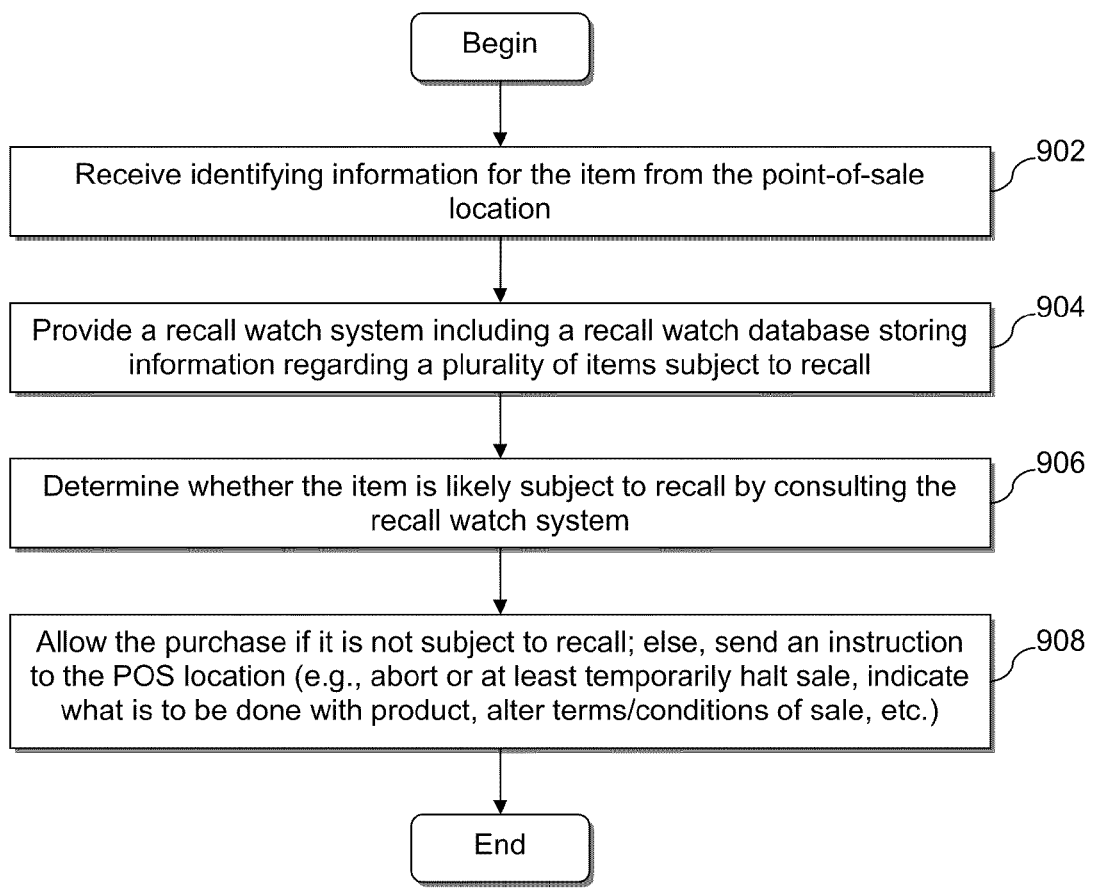
FIG. 9 is a flowchart illustrating a process for handling recalled items presented for purchase in accordance with an exemplary embodiment.

FIG. 9 is a flowchart illustrating a process for handling recalled items presented for purchase in accordance with an exemplary embodiment. Similar to step S802 above, identifying information for the item is received from the point-of-sale location in step S902. A recall watch system including a recall watch database storing information regarding a plurality of items subject to recall, along with appropriate programmed logic circuitry, is provided in step S904. In step S906, it is determined whether the item is likely subject to recall by consulting the recall watch system. In step S908, the purchase is allowed if the item is not subject to recall; otherwise, an instruction is sent to the POS location. The instruction may be an instruction to, for example, abort or at least temporarily halt sale (e.g., while a decision is being made as to what to do with the recalled item at the POS location by POS personnel, the would-be purchaser, etc.), indicate what is to be done with product, alter terms/conditions of sale, etc. As above, the checking may be performed in connection with one or more levels of identifiers (e.g., unique identifiers, plural non-unique identifiers, etc.) in different embodiments. And as above, certain exemplary embodiments may be provided for use in connection with an ER system, e.g., such that the item may be registered therewith if the sale is allowed, perhaps with altered return/warranty information (sold "as is," with a reduced warranty/return period, etc.), modified sales data (e.g., price, etc.), and/or the like.

Figure 10:
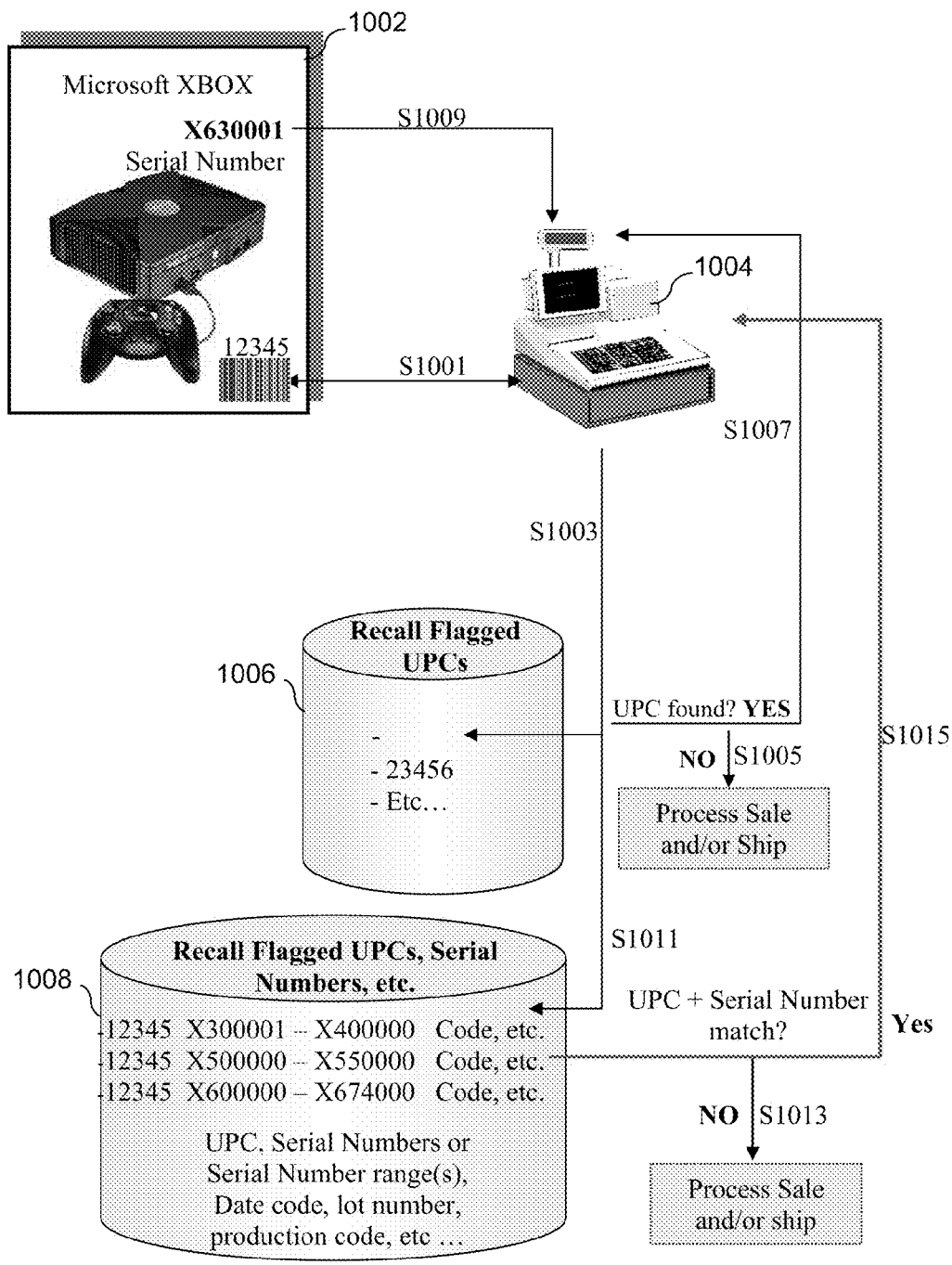
FIG. 10 is a high level view illustrating techniques for issuing product recall alerts in accordance with an exemplary embodiment.

FIG. 10 is a high level view illustrating techniques for issuing product recall alerts in accordance with an exemplary embodiment. Similar to the above, the FIG. 10 example techniques may be used to help identify products flagged for recall, e.g., at a point-of-sale, at a point-of-shipment (e.g., for e-tailers, distribution centers, or the like), or elsewhere in the supply chain. Once a manufacturer identifies certain products that are to be recalled, a retailer's store and/or distribution center, or an e-tailer's fulfillment center, for example, may be provided with access to a database containing the determining markings of those product effected by the recall. These illustrative techniques advantageously help segregate effected inventory already in stores, distribution centers, and fulfillment centers.

The FIG. 10 example illustrates what may happen once products with certain serial numbers or serial number range(s), date codes, lot numbers, production codes, etc., are targeted for a manufacturer's recall. More particularly, a POS system or similar system at another location in the supply chain may be alerted whenever a product on a recall list is processed for sale and/or for shipment. The same process may also be used for products with certain manufacture dates, or different models with the same SKU number (e.g., UPC, EAN, JAN, EPC, etc.). These techniques may be particularly advantageous when mixed inventory (e.g., good and bad inventory) is in the field and/or at a retailer/e-tailer/or other location in the supply chain.

As shown in FIG. 10, a product 1002 having a serial number and a barcode, for example, is presented for purchase at a POS location. Its barcode is scanned at a register 1004 (step S1001). The register 1004 then initiates a lookup (step S1003) in a first database or data store 1006 based on the UPC to determine whether the UPC has been flagged. If the UPC is not found in the first database or data store 1006, then the product 1002 is sold or shipped (step S1005). If, however, the UPC is found in the first database or data store 1006, a prompt asking for the serial number, date code, or other identifying information is provided (step S1007), and that information I entered to the register 1004 (step S1009). This further information is then checked against a second database or data store 1008 (step S1011). If there is no match, then the sale or shipment is processed (step S1013). If there is a match, however, the sale/shipment is not permitted and an RTV code or the like may be sent to the register in certain example embodiments (step S1015). Of course, other actions may be taken in accordance with the above-described and/or other techniques in such cases.

Although certain exemplary embodiments have been described as relating to serial numbers and/or IMEI numbers, it will be appreciated that the techniques described herein may be applied to products identified in different ways, e.g., by EPC, RFID, EAN, JAN, etc.

Additionally, although certain exemplary embodiments have been described in relation to products having serial numbers, the present invention is not so limited. For example, unserialized products may also take advantage of the techniques described herein by virtue of other unique and/or identifiable characteristics thereof. Furthermore, certain products are produced in such limited quantities that their mere existence may be self-authenticating and/or self-identifiable. Additionally, certain products are so tightly controlled that their appearance via other channels may indicate a potential problem worthy of notification to a trusted authority (e.g. the auction house, a manufacturer, a trusted ER intermediary, etc.).

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the scope of the appended claims.

What is claimed is:

1. A method of processing return and/or warranty requests at a point-of-sale (POS) location, the method comprising:
   receiving, from the POS location, at least first identifying information for an item presented in connection with a return or warranty request from a consumer who previously purchased the item;
   determining, using at least one processor of an electronic registration (ER) system, whether the item qualifies for the return or warranty request based on data stored in an ER database;
   when it is determined that the item does not qualify for the return or warranty request based on data stored in an ER database including the item's original sales date:
      determining, using at least one processor, whether the item is likely subject to a recall, comprising:
         first using the first identifying information, comprising a non-unique but narrowing identification mark to determine if it the item is likely subject to a recall,
         then using a unique identifier of the item, the unique identifier comprising a combination of UPS and serial number, or an EPC of the item, and
         when it is determined that the item is subject to the recall, sending an override instruction to the POS location; and,
   when it is determined that the item qualifies for the return or warranty request based on data stored in an ER database:
      determining, using at least one processor, whether the item is likely subject to a recall; and
      sending to the POS location modified terms and/or conditions to be used to determine if the return or warranty request is permitted.

2. The method of claim 1, wherein the override instruction includes a first instruction regarding how the return or warranty request of the item subject to the recall is to be handled.

3. The method of claim 2, wherein the override instruction further includes a second instruction regarding what is to be done with the item after the return or warranty request is processed at the POS location in accordance with the first instruction.

4. The method of claim 2, wherein the first identifying is a unique identifier of the item comprising either a combination of a UPC and a serial number of the item, or an EPC of the item.

5. The method of claim 1, wherein the first identifying information is a non-unique identifier of the item.

6. The method of claim 1, further comprising maintaining a recall watch list to be consulted at least during the determination as to whether the item is likely subject to a recall, the recall watch list being updatable by manufacturers.

7. The method of claim 1, wherein the item does not qualify for the return or warranty based on data stored in an ER database and the item is subject to the recall.

8. An electronic registration (ER), comprising:
   an interface configured to receive at least first identifying information for an item presented by a consumer in connection with a return or warranty request at a from the point-of-sale (POS) location;
   an ER database storing information concerning return and/or warranty information for a plurality of products; and
   at least one processor configured to:
      determine whether the item presented in connection with the return or warranty request qualifies for the return or warranty request based on data stored in the ER database including the item's original sales date;
      when it is determined that the item does not qualify for the return or warranty request based on data stored in an ER database:
         (a) determine whether the item is likely subject to a recall after consulting a recall watch database storing information identifying products subject to recall, wherein such determination comprises:
            first using the first identifying information, comprising a non-unique but narrowing identification mark comprising a master serial number or a serial number mask to determine if it the item is likely subject to a recall,
            then using a unique identifier of the item, the unique identifier comprising a combination of UPS and serial number, or an EPC of the item, and
            and
         (b) cause an override instruction to be sent to the POS location when it is determined that the item is subject to the recall; and
      when it is determined that the item qualifies for the return or warranty request based on data stored in an ER database: (a) determine, using at least one processor, whether the item is likely subject to a recall, and (b) send to the POS location modified terms and/or conditions to be used to determine if the return or warranty request is permitted.

9. The system of claim 8, wherein the override instruction includes a first instruction regarding how the return or warranty request of the item subject to the recall is to be handled.

10. The system of claim 9, wherein the override instruction further includes a second instruction regarding what is to be done with the item after the return or warranty request is processed at the POS location in accordance with the first instruction.

11. The system of claim 9, wherein the first identifying is a unique identifier of the item.

12. The system of claim 11, wherein the unique identifier is either a combination of a UPC and a serial number of the item, or an EPC of the item.

13. The system of claim 8, wherein the first identifying information is a non-unique identifier of the item.

14. The system of claim 13, wherein:
   the interface is further configured to receive second identifying information for the item from the point-of-sale location; and the at least one processor is further configured to confirm whether the item is subject to the recall using the second identifying information.

15. The system of claim 8, wherein the recall watch database is updatable by manufacturers.

16. A recall watch system for processing an item presented for purchase at a point-of-sale (POS) location, comprising:
an interface configured to receive at least first identifying information for the item from the point-of-sale location;
a recall watch database storing information regarding a plurality of items subject to recall;
an electronic registration (ER) database storing information concerning return and/or warranty information for a plurality of products; and
at least one processor configured to:
determine whether the item is likely subject to a recall based on the information stored in the recall watch database, wherein such determination comprises:
first using the first identifying information, comprising a non-unique but narrowing identification mark comprising a master serial number or a serial number mask to determine if it the item is likely subject to a recall,
then using a unique identifier of the item, the unique identifier comprising a combination of UPC and serial number, or an EPC of the item,
cause an instruction to be sent to the POS location when it is determined that the item is subject to recall, and
allow the purchase when it is determined that the item is not subject to recall,
wherein the instruction indicates that return and/or warranty terms and/or conditions of the item are to be altered upon the purchase of the item compared to a situation in which the item were not subject to recall and updating the ER database with the altered return and/or warranty terms and/or conditions for the item.

17. The system of claim 16, wherein the instruction indicates that the purchase of the item is to be aborted or at least temporarily halted.

18. The system of claim 17, wherein the instruction further indicates that what is to be done with the item at the POS location after the purchase is aborted or at least temporarily halted.

19. The system of claim 16, further comprising a link to an electronic registration (ER) database storing information concerning return and/or warranty information for a plurality of products, the ER database being updatable with the altered return and/or warranty terms and/or conditions for the item.

20. The system of claim 16, wherein the instruction is based on information stored in recall watch database concerning the severity of the problem prompting the recall.

21. The system of claim 16, wherein the unique identifier is either a combination of a UPC and a serial number of the item, or an EPC of the item.

22. The system of claim 16, wherein the first identifying information is a non-unique identifier of the item.

23. The system of claim 16, wherein:
the interface is further configured to receive second identifying information for the item from the point-of-sale location; and
the at least one processor is further configured to confirm whether the item is subject to recall using the second identifying information.

* * * * *